United States Patent
Odent et al.

(10) Patent No.: US 11,370,896 B2
(45) Date of Patent: Jun. 28, 2022

(54) IONIC NANOCOMPOSITE MATERIALS, METHODS OF MAKING SAME, AND USES OF SAME

(71) Applicants: Cornell University, Ithaca, NY (US); Université de Mons, Mons (BE)

(72) Inventors: Jérémy Odent, Rebaix (BE); Emmanuel P. Giannelis, Ithaca, NY (US); Jean-Marie Raquez, Mons (BE); Philippe Dubois, Braives (BE)

(73) Assignees: CORNELL UNIVERSITY, Ithaca, NY (US); UNIVERSITÉ DE MONS, Mons (BE)

( * ) Notice: Subject to any disclaimer, the term of this patent is extended or adjusted under 35 U.S.C. 154(b) by 474 days.

(21) Appl. No.: 16/332,296

(22) PCT Filed: Sep. 12, 2017

(86) PCT No.: PCT/US2017/051112
§ 371 (c)(1),
(2) Date: Mar. 11, 2019

(87) PCT Pub. No.: WO2018/049379
PCT Pub. Date: Mar. 15, 2018

(65) Prior Publication Data
US 2019/0233613 A1    Aug. 1, 2019

Related U.S. Application Data

(60) Provisional application No. 62/393,332, filed on Sep. 12, 2016.

(51) Int. Cl.
| | |
|---|---|
| *B01J 31/00* | (2006.01) |
| *C08K 3/36* | (2006.01) |
| *C08K 9/04* | (2006.01) |
| *C08K 9/06* | (2006.01) |
| *C08J 5/18* | (2006.01) |
| *C08L 67/04* | (2006.01) |
| *C08L 75/04* | (2006.01) |

(52) U.S. Cl.
CPC .............. *C08K 3/36* (2013.01); *B01J 31/00* (2013.01); *C08J 5/18* (2013.01); *C08K 9/04* (2013.01); *C08K 9/06* (2013.01); *C08L 67/04* (2013.01); *C08L 75/04* (2013.01); *C08J 2367/04* (2013.01); *C08J 2375/04* (2013.01); *C08K 2201/001* (2013.01); *C08K 2201/011* (2013.01); *C08L 2201/12* (2013.01)

(58) Field of Classification Search
CPC ... B01J 31/00; C08K 3/36; C08K 9/04; C08K 9/06; C08K 2201/001; C08K 2201/011; C08J 5/18; C08J 2367/04; C08J 2375/04; C08L 67/04; C08L 75/04; C08L 2201/12
USPC ...................................................... 524/492
See application file for complete search history.

(56) References Cited

U.S. PATENT DOCUMENTS

| | | | |
|---|---|---|---|
| RE37,385 E | 9/2001 | Okada et al. | |
| 7,947,774 B2 | 5/2011 | Sogah | |
| 9,034,371 B2 | 5/2015 | Giannelis et al. | |
| 2005/0158390 A1* | 7/2005 | Rana ..................... | B82Y 30/00 424/489 |
| 2013/0045877 A1 | 2/2013 | Yap et al. | |
| 2014/0070139 A1 | 3/2014 | Giannelis et al. | |
| 2014/0154588 A1 | 6/2014 | Archer et al. | |
| 2015/0073476 A1 | 3/2015 | Brown et al. | |
| 2016/0069811 A1 | 3/2016 | Rabolt et al. | |
| 2016/0170095 A1 | 6/2016 | Zheng | |

FOREIGN PATENT DOCUMENTS

CN    103772872 B    6/2016

OTHER PUBLICATIONS

Rodriguez et al., "The synthesis and properties of nanoscale ionic materials," Applied Organometallic Chemistry, Feb. 17, 2010, vol. 24, No. 8, pp. 581-589. (Year: 2010).*
Rodriguez, R., et al., Nanoscale Ionic Materials, Advanced Materials, Aug. 27, 2008, vol. 20, pp. 4354-4358.
Xu, J., et al., High performance shape memory polymer networks based on rigid nanoparticle cores, Proceedings of the National Academy of Sciences of the United States of America, Apr. 27, 2010, vol. 107, No. 17, pp. 7652-7657.
Odent, J., et al., Ulla-Stretchable Ionic Nanocomposites: From Dynamic Bonding to Multi-Responsive Behavior, Journal of Materials Chemistry A., Jul. 14, 2017, vol. 5, pp. 13357-13363.

(Continued)

*Primary Examiner* — Kelechi C Egwim
(74) *Attorney, Agent, or Firm* — Johnson, Marcou, Isaacs & Nix, LLC; Paul J. Roman, Jr.

(57) ABSTRACT

An ionic nanocomposite comprising a nanomaterial comprising charged groups disposed on at least a portion of a surface of the nanomaterial and a polymer material comprising charged pendant group and/or end functionalized charged groups, where the charged groups of the nanomaterial and the charged pendant groups of the polymer material have opposite charges and the nanomaterial and polymer material are connected by one or more ionic bonds. A nanomaterial can be nanoparticles comprising sulfate groups disposed on at least a portion of the surface of the nanoparticles. The polymer material can be a polymer with pendant imidazolium groups. An ionic nanocomposite can be present as a film (e.g., a thin film). An ionic nanocomposite can be used in devices. A nanocomposite can be used in various coating application.

46 Claims, 23 Drawing Sheets

(56) References Cited

OTHER PUBLICATIONS

Odent, J., et al., Shape-Memory Behavior of Polylactide/Silica Ionic Hybrids, Macromolecules, Mar. 27, 2017, vol. 50, pp. 2896-2905.

Li, X, et al., Synthesis of imidazolium-functionalized ionic polyurethane and formation of CdTe quantum dot—polyurethane nanocomposites, Journal of Polymer Science, Part A: Polymer Chemistry, Nov. 7, 2011, vol. 50, pp. 509-516.

Jiang, H., et al., Facile fabrication of poly (tetrafluoroethylene)/ graphene nanocomposite via electrostatic self-assembly approach, Composites Science and Technology, Aug. 18, 2014, vol. 103, pp. 28-35.

Pham, V.H., et al., Highly Conductive Poly(methyl methacrylate) (PMMA)-Reduced Graphene Oxide Composite Prepared by Self-Assembly of PMMA Latex and Graphene Oxide through Electrostatic Interaction, ACS Appl. Mater. Interfaces, Apr. 18, 2012, vol. 4, No. 5, pp. 2630-2636.

Lee, J.H., et al.. Fabrication of hybrid nanocomposites of poly(acrylic acid)-grafted MWNTs and spherical aggregates of palladium nanoparticles with POSS, Composite Interfaces, 2012, vol. 19, No. 9, pp. 583-592.

Martins, P., et al.. Role of Nanoparticle Surface Charge on the Nucleation of the Electroactive β-Poly(vinylidene fluoride) Nanocomposites for Sensor and Actuator Applications, Journal of Physical Chemistry, Jun. 26, 2012, vol. 16, No. 29, pp. 15790-15794.

Lemmers, M., et al., Physical Gels Based on Charge-Driven Bridging of Nanoparticles by Triblock Copolymers, Langmuir, Jul. 26, 2012, vol. 28, No. 33, pp. 12311-12318.

Muto, H., et al., Transparent Conductive CNT/PMMA Nanocomposite Via Electrostatic Adsorption Technique, ECS Transactions, 2013, vol. 50, No. 6, pp. 165-169.

Fernandes, N.J., et al., Synthesis and Properties of Highly Dispersed Ionic Silica-Poly(ethylene oxide) Nanohybrids, ACS Nano, Feb. 26, 2013, vol. 7, No. 2, pp. 1265-1271.

Rodriguez, R., et al., The synthesis and properties of nanoscale ionic materials, Applied Organometallic Chemistry, Feb. 17, 2010, vol. 24, No. 8, pp. 581-589.

Jespersen, M.L., et al., Canopy Dynamics in Nanoscale Ionic Materials, ACS Nano, Jul. 27, 2010, vol. 4, No. 7, pp. 3735-3742.

* cited by examiner

IONIC NANOCOMPOSITE MATERIALS, METHODS OF MAKING SAME, AND USES OF SAME

CROSS REFERENCE TO RELATED APPLICATIONS

This application claims priority to U.S. Provisional Application No. 62/393,332, filed on Sep. 12, 2016, the disclosure of which is hereby incorporated by reference.

STATEMENT REGARDING FEDERALLY SPONSORED RESEARCH

This invention was made with government support under contract no. DMR-1120296 awarded by the National Science Foundation. The government has certain rights in the invention.

FIELD OF THE DISCLOSURE

The disclosure generally relates to ionic nanocomposite materials. More particularly the disclosure generally relates to ionic nanocomposite materials formed from charged nanomaterial(s) and charged polymer material(s).

BACKGROUND OF THE DISCLOSURE

Over the last several years, dynamic polymer systems, where a specific bond or interaction can selectively undergo reversible breaking and reformation under specific conditions have attracted widespread attention. This design offers the possibility to structure materials systems with adaptable properties from stimuli-responsiveness, shape-memory to self-healing characteristics. A variety of dynamic interactions, such as multiple hydrogen bonding, hydrophobic interactions, π-π stacking, and metal-ligand coordination can be used to design such adaptive systems. Meanwhile, other responsive systems have been reported upon the introduction of purely ionic interactions in the materials, although it is noted that these systems are based on molecular building blocks. Among materials governed by ionic interactions, ionomers are a relevant class of polymers with dynamic bonds, offering materials with self-assembling, adjustable and self-healing properties. These adaptive systems have the potential to revolutionize technologies in sensors and actuators, adhesives, coatings and paintings, elastomer (tire) industry, energy systems as well as numerous biomedical applications, to name a few.

The growing interest in nanoparticle systems is readily fueled by the unusual opportunities these systems present for tuning materials properties on small scales and the promise of unprecedented performance. This led to the design of hybrid or nanocomposite systems based on surface-functionalized nanoparticles. These hybrid systems, called nanoscale ionic materials (NIMs), are organic-inorganic hybrids consisting of a soft polymeric canopy bound to a well-defined nanoparticle core by ionic bonding. Due to the ionic interactions present, the perennial dispersion challenges associated with the current nanocomposites are minimized while the dynamic nature of the ionic bonds provides opportunities for adaptive/multi-responsive properties. Along this backdrop, the molecular-level dynamics in NIMs were successfully characterized to finally substantiate that the polymeric canopy undergoes rapid exchange between the ionically modified nanoparticles. Exploiting the unique properties of the inherent ionic bonds or interactions within the NIMs ultimately allows control of both the structure and dynamics through a simple yet versatile materials platform suitable for a wide array of applications. Owing to an interest in developing materials with liquid-like properties, in most of the previous work canopies with relatively short polymer chains have been employed.

Shape-memory polymers (SMPs) are a class of stimuli-responsive materials that have attracted widespread attention because of both scientific interest as well as their potential in various applications, especially in textiles, biomedicine (e.g. self-tightening sutures), and advanced engineering including the electronics and aerospace industries. When subjected to external stimuli such as a change in temperature, light, moisture, or magnetic field, SMPs can recover from a metastable state to their original shape. Among them, temperature responsive SMPs are the most promising and by far the most used in industry. They usually consist of a two-component system: permanent domains made of either chemical or physical crosslinks and switching domains, which are associated with a suitable transition temperature ($T_{trans}$). A sample cooled below $T_{trans}$ after deformation recovers its original shape when heated above $T_{trans}$. The shape recovery is thought to be due to the entropic relaxation of the polymer chains. This feature is naturally very attractive and has made SMPs the focus of several scientific and engineering studies. The objective is to develop smart materials and integrate them in high performance applications such as deployable and morphing structures, medical implants, actuators, and self-healing systems. A common method to trigger shape memory in polymers is to first heat above the glass or melting transition for amorphous and crystalline polymers, respectively. After heating and deformation, the material is fixed by cooling. Subsequent heating allows the sample to recover its original shape. Shape recovery relies on the presence of reversible, physical or chemical crosslinks that prevent permanent chain slippage. Physical crosslinks in particular include ionic interactions, hydrogen bonding, π-π stacking, and metal-ligand interactions and because of their nature they are reversible.

Over the last decade, the design of shape-memory materials has focused on dynamic and supramolecular polymers, where a specific bond or interaction can be broken and reformed upon external stimulus. Besides their shape-shifting ability, such dynamic systems have the ability to adapt to their environment and possess a wide range of intriguing physical properties. Recent studies have successfully demonstrated various tunable materials based on a double-network design.

Despite extensive efforts to engineer new polymer nanocomposites for a broad range of technologies and provide value-added performance to the system without the associated property trade-offs, true demonstrations are few and far between. Following to the state-of-art literature, most of the preceding publications do not exploit the dynamics at the nanoparticle-polymer interface to combine novel multi-responsive/smart properties with the reinforcement ability of nanoparticles within solid nanocomposites.

SUMMARY OF THE DISCLOSURE

In an aspect, the present disclosure provides an ionic nanocomposite material. The ionic nanocomposite material comprises one or more ionic bonds between the nanomaterial(s) and polymer(s). The ionic bonds provide reversible crosslinks between the nanomaterial(s) and polymer(s). An ionic nancomposite material can have a network structure comprised of reversible ionic bonds. An ionic nanocomposite material can have multimaterial, e.g., multiparticle, interaction with a polymer material, e.g., a polymer.

In an example, an ionic nanocomposite comprises: a) a plurality of nanomaterials (e.g., nanoparticles (NPs)), where the nanomaterial is electrically charged (e.g., the nanomaterials comprise a plurality of electrically charged functional groups); and b) one or more polymer material (e.g., a first polymer and, optionally, a second polymer material) comprising a plurality of organic functional groups bearing the opposite charge of the NPs, where the NPs and the polymer interact through ionic interactions (e.g., are connected via one or more reversible ionic bonds).

An ionic nanocomposite can comprise a variety of nanomaterials. A nanomaterial has at least one nm scale dimension. An ionic nanocomposite can comprise a variety of polymer materials (e.g., polymers). The polymer materials comprise one or more charged groups (e.g., positively charged groups or negatively charged groups). The charged groups can be pendant groups (e.g., pendant from the polymer backbone), end groups of the polymer, or a combination thereof. An ionic nanocomposite material can have one polymer material (e.g., polymer) or a mixture of polymer materials (e.g., polymers). For example, an ionic nanocomposite comprises two different polymers (e.g., a first polymer where D is an alkyl moiety comprising 2 carbons and a second polymer where D is an alkyl moiety comprising 3 carbons).

A nanocomposite can exhibit desirable properties. Examples of desirable properties include, but are not limited to, stiffness, toughness, stretchability, shape healing properties, healing to damage properties, shape memory properties, and combinations thereof. In an example, a nanocomposite exhibits improved stiffness, toughness, stretchability, or a combination thereof in comparison to the polymer material(s) of the nanocomposite alone (in the absence of the nanomaterial).

In an aspect, the present disclosure provides methods of making ionic nanocomposites of the present disclosure. For example, a dispersion of nanomaterial(s) (e.g., nanoparticles) in a solvent (e.g., aqueous media (such as, for example, water), THF, DMF, or DMSO) is contacted with polymer material(s) (e.g., water soluble polymer material(s)). In another example, dry nanomaterials(s) is/are extruded with polymer material(s), under conditions such that the polymer material(s) are melted. Optionally, a solvent can be used in the extrusion process.

In an aspect, the present disclosure provides a film comprising one or more ionic nanocomposite material of the present disclosure. The film can be a thin film. The film can be planar or non-planar. A film can further comprise one or more additional components. For example, a film further comprises a salt. For example, addition of salt provides a conducting film.

In an aspect, the present disclosure provides compositions comprising one or more ionic nanocomposites of the present disclosure. In an example, a composition comprises one or more ionic nanocomposites of the present disclosure.

For example, ionic nanocomposites are used in compositions such as, for example, adhesives, coatings (e.g., paints). Accordingly, in various examples, a composition (e.g., an adhesive composition, a coating composition, such as, for example, a paint) comprises one or more ionic nanocomposites of the present disclosure.

In an aspect, the present disclosure provides uses of ionic nanocomposites of the present disclosure. Ionic nanocomposites can be used in devices, in the elastomer (tire) industry, in energy systems, and in biomedical applications.

For example, ionic nanocomposites are used in devices such as, for example, sensors and actuators. Accordingly, in various examples, a sensor or actuator comprises one or more ionic nanocomposites of the present disclosure (e.g., one or more film of the present disclosure).

For example, ionic nanocomposites are used in biomedical prostheses. Accordingly, in various examples, a biomedical prosthesis comprises one or more ionic nanocomposites of the present disclosure. A nanocomposite with a melting point close to body temperature allows triggering of the shape-memory effect by contact with the body.

For example, ionic nanocomposites are used in articles of manufacture. Accordingly, an article of manufacture comprises one or more ionic nanocomposites of the present disclosure (e.g., a film comprising one or more ionic nanocomposites). An article of manufacture can have any three-dimensional shape. In various examples, the article of manufacture is a three-dimensional object.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
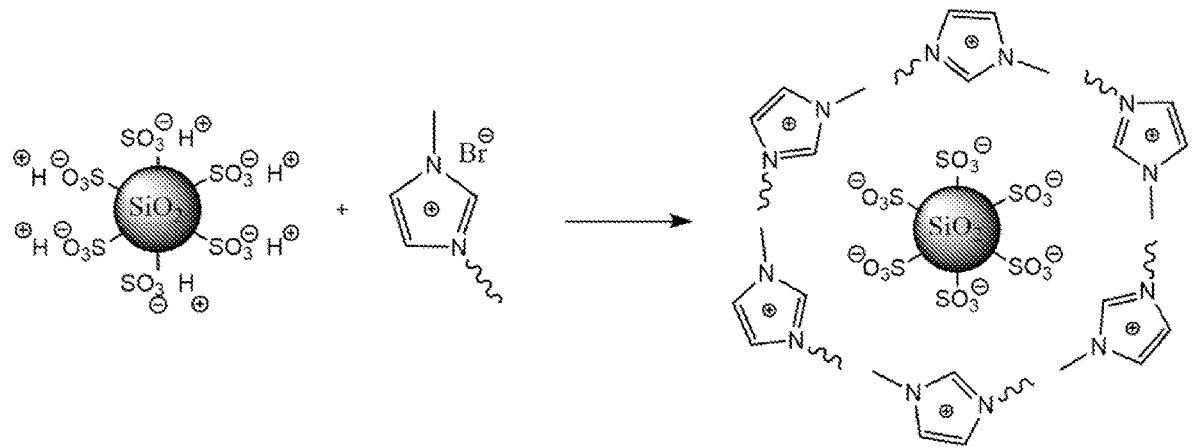
FIG. 1. Self-assembly of imidazolium-functionalized polyurethane and sulfonated-modified silica nanoparticles.

Although claimed subject matter will be described in terms of certain embodiments and examples, other embodiments and examples, including embodiments and examples that do not provide all of the benefits and features set forth herein, are also within the scope of this disclosure. Various structural, logical, process step, and electronic changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

The present disclosure provides ionic nanomaterials. The present disclosure also provides methods of making and using the nanomaterials.

The present disclosure provides new adaptable/multi-responsive solid, nanocomposite materials that involve the use of reversible dynamic (ionic) bonds. For example, the materials are based on imidazolium-functionalized polyurethane (im-PU) and surface-modified sulfonated silica nanoparticles (nanosilica-$SO_3H$), which are ionically bound together. The hybrid nature allows for their properties to be readily engineered by selectively varying the system components. The reversible nature of the ionic links introduces structural and dynamic behavior into the resulting nanocomposites. The nanocomposite materials can be stiff, tough, and highly stretchable materials along with full-recovery through both shape-memory and self-healing characteristics.

This unpreceded set of properties is attributed to the dynamic and reversible nature of the electrostatic linkages present in the system with the reinforcement ability of nanoparticles in nanocomposites. As an added benefit, the presence of ionic interactions between, for example, polymer chains and the nanoparticles leads to well-dispersed systems solving a recurrent challenge in organic-inorganic nanocomposites. The strain rate properties are presented and discussed in the context of the dynamic nature of the system. A highlight of this work is the remarkable recovery of the materials, so that extensive deformation or damage are reversible. It is expected that such a system combining enhanced mechanical performance with reversible plasticity and self-healing properties provide unique opportunities for current and future applications.

Besides the unique design of a new class of multi-responsive materials built around nanoparticles acting as ionic crosslinks, the present disclosure provides, in various examples, a combination of unprecedented structural and dynamic behavior leading to multi-responsive materials that, to our knowledge, has not been reported with current state-of-the-art systems, where an increase in modulus is typically linked by a decrease in both elongation and toughness. In addition, the nanocomposites exhibit a unique strain-dependent behavior (the elongation to failure increases with strain rate). To the best of our knowledge this is the first demonstration of nanocomposites becoming stiffer, tougher, and more surprisingly stretchier with increased loading rate. Finally, the nanocomposites also recover from any substantial deformation and damage leading to shape-memory and self-healing, respectively. The new, ionic nanocomposites have the potential to revolutionize the burgeoning arena of advanced, smart materials. In this respect, some features of the instant nanocomposites include:

the straightforward construction of a novel family of solid nanocomposites built on ionic interactions characterized by a unique mechanical property under high-loading performances;

the endowment of multi-responsive behavior in the instant materials (e.g., solid materials) while previously reported approaches require systems with elevated mobility at the molecular level (especially, to impart self-healing to the materials), which usually impacts their inherent stiffness on the contrary way; and the opening up of these dynamic nanocomposites relating to this particular nanoparticle-polymer interface for emerging fields such as 3D-printing technology and smart adaptive materials upon any gradient in mechanical stresses.

In an aspect, the present disclosure provides an ionic nanocomposite material. The ionic nanocomposite material comprises one or more ionic bonds between the nanomaterial(s) and polymer(s). The ionic bonds provide reversible crosslinks between the nanomaterial(s) and polymer(s). An ionic nancomposite material can have a network structure comprised of reversible ionic bonds (e.g., ionic network). An ionic nanocomposite material can have multimaterial, e.g., multiparticle, interaction with a polymer material, e.g., a polymer.

In an example, an ionic nanocomposite comprises: a) a plurality of nanomaterials (e.g., nanoparticles (NPs)), where the nanomaterial is electrically charged (e.g., the nanomaterials comprise a plurality of electrically charged functional groups); and b) one or more polymer material (e.g., a first polymer and, optionally, a second polymer material) comprising a plurality of organic functional groups bearing the opposite charge of the NPs, where the NPs and the polymer interact through ionic interactions (e.g., are connected via one or more reversible ionic bonds).

An ionic nanocomposite can comprise a variety of nanomaterials. A nanomaterial has at least one nm scale dimension. Examples of nanomaterials include, but are not limited to, nanoparticles (e.g., silica nanoparticles, metal oxide nanoparticles, metal nanoparticles, quantum dots, silicate materials, clays, nanotubes (e.g., carbon nanotubes), hallosites, layered double hydroxides, graphene, and graphene oxide. In an example, a nanomaterial has at least one dimension of 1 to 200 nm, including all integer nm values and ranges therebetween. In another example, a nanomaterial has at least one dimension of 1 to 100 nm. In an example, a nanomaterial is nanoparticles (e.g., silica nanoparticles) having a diameter (e.g., longest dimension) of 1 to 200 nm, including all integer nm values and ranges therebetween. The nanomaterials can have various morphologies. For example, the nanomaterials have spherical morphology (e.g., silica nanoparticles and quantum dots), cylindrical morphology (e.g., carbon nanotubes). For example, the nanomaterials are nanoplatelets (e.g., clays such as, for example, aluminosilicate clays) or nanorods (e.g., gold nanorods or silver nanoparticles). In various examples, a nanomaterial is a 2-dimensional material (e.g., clays or graphene), a 1-dimensional material (e.g., a carbon nanotubes, halloysites, or gold or silver nanorods), or a 0-dimensional material (e.g., a nanoparticle such as, for example, silica nanoparticles or quantum dots).

A nanomaterial comprises a plurality of sulfate ($SO_3^-$) groups, carboxylate (—C(O)O$^-$) groups, phosphate (—P(O)$_3$O$^-$) groups, or a combination thereof disposed on at least an exterior surface of the nanomaterial. For example, the nanomaterial is nanoparticles comprising a plurality of sulfate ($SO_3^-$) groups, carboxylate (—C(O)O$^-$) groups, phosphate (—P(O)$_3$O$^-$) groups, or a combination thereof disposed on at least an exterior surface of the nanomaterial. A nanomaterial can have various density of charge values. For example, a nanomaterial has a charge density of 0.01 to 3 mmol/g, including all 0.01 mmol/g values and ranges therebetween. For example, nanomaterial is present in the ionic nanocomposite at 0.1 to 99.9 by weight (based on the total weight of the ionic nanocomposite), including all integer % by weight values and ranges therebetween. In another example, nanomaterial is present in the ionic nanocomposite at 0.1 to 40% by weight. In another example, nanomaterial is present in the ionic nanocomposite at 10 to 30% by weight. In another example, nanomaterial is present in the ionic nanocomposite at 0.1 to 20% by weight.

An ionic nanocomposite can comprise a variety of polymer materials (e.g., polymers). The polymer materials comprise one or more charged groups (e.g., positively charged groups or negatively charged groups). The charged groups can be pendant groups (e.g., pendant from the polymer backbone), end groups of the polymer, or a combination thereof. Examples of charged pendant groups include, but are not limited to, imidazolium groups, ammonium groups, triazolium groups, phosphonium groups, pyridinium groups, and combinations thereof. For example, a polymer material has 1 to 50 mol % charged groups, including all integer mol % values and ranges therebetween. In another example, a polymer material has 1 to 25 mol % charged groups. For example, a polymer material (e.g., individual polymer chains of a polymer) has 1 to 1000 charged groups, including all integer number of charged groups and ranges therebetween.

Polymer materials can have a variety of molecular weight (e.g., Mw and Mn). For example, a polymer material (e.g., polymer) has an absolute molecular weight (e.g., Mw and Mn) of 200 to 1,000,000, including all integer g/mol values and ranges therebetween. For example, a polymer material (e.g., polymer) has a molecular weight (e.g., Mw and Mn) of 200 to 200,000 g/mol, including all integer g/mol values and ranges therebetween. The molecular weight can be measured by methods known in the art. For example, the polymer molecular weight (e.g., Mw and/or Mn) is measured by gel permeation chromatography using polystyrene standards. In other examples, a polymer material (e.g., polymer) has a molecular weight (e.g., absolute or measured by GPC) of 10,000 to 50,000 g/mol or 20,000 to 50,000 g/mol.

Polymers can be made using, for example, acrylate or methacrylate chemistry, polycondensation, click chemistry, ring-opening polymerization, or post-functionalization (or grafting). Polymers can be homopolymers or copolymers (e.g., random copolymers or block copolymers). Examples of suitable polymers include, but are not limited to, polyurethanes, polyacrylates (e.g., polymethacrylates), silicon polymers (e.g., PDMS), polystyrenes, polybutadienes, polyethylenes, polypropylenes, and polylactides. In various examples, a polymer has urethane bonds (—O—(CO)—(NH)—), urea bonds (—(NH)—(CO)—(NH)—) or thiourethane bonds (—(S)—(CO)—(NH)—).

For example, a polymer material is present at 0.1 to 99.9% by weight (based on the total weight of the ionic nanocomposite), including all integer % by weight values and ranges therebetween. In another example, a polymer material is present at 60 to 99.9% by weight (based on the total weight of the ionic nanocomposite). In another example, a polymer material is present at 80 to 99.9% by weight.

In an example, the polymer material is a polymer having the following structure:

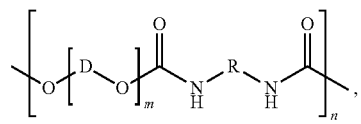

where D is, at each occurrence in the polymer, either a alkyl moiety comprising 2 to 14 carbons (e.g, —[—CH$_2$—]-z, where z is 1, 2, 3, 4, 5, or 6) or an alkyl moiety comprising 3 to 6 carbons and m is 1 to 50,000 (e.g., 1 to 20,000); R is, at each occurrence in the polymer, an aliphatic moiety comprising 1 to 24 carbons, a carbocyclic moiety (e.g., a non-aromatic carbocyclic moiety, completely aromatic carbocyclic moiety (aryl moiety) or a partially aromatic carbocyclic moiety) comprising 6 to 24 carbons, or a heterocyclic moiety (e.g., a non-aromatic heterocyclic moiety, a completely aromatic heterocyclic moiety (heteroaryl moiety), or a partially aromatic heterocyclic moiety) comprising 2 to 24 carbons and one or more heteroatom selected from the group consisting of N, O, S, P, and combinations thereof; and n is 1 to 200,000, including all integer values and ranges therebetween (e.g., 2 to 10,000, 2 to 20,000, 2 to 50,000, 2 to 100,000, or 2 to 150,000), and where at least one D further comprises one or more pendant positively charged group (e.g., one or more pendant positively charged group comprising 0 to 24 carbons, such as for example, aliphatic moieties, and one or more quaternary nitrogen (e.g., heterocyclic moieties such as, for example, imidazole moieties)). In various other examples, this polymer has urea bonds (—(NH)—(CO)—(NH)—) or thiourethane bonds (—(S)—(CO)—(NH)—) rather than urethane bonds (—O—(CO)—(NH)—).

A polymer can comprise a plurality of alkyl ether moieties (e.g., —$CH_2$—$CH_2$—O— groups, such as for example, the alkyl ether moiety in the structure above that includes the D moiety). For example, a polymer comprises one or more alkyl ether moieties having a molecular weight of up to and including 50,000 g/mol. In an example, a polymer comprises one or more alkyl ether moieties having a molecular weight of up to and including 20,000 g/mol. The pendant moiety can be part of the alkyl moiety. Accordingly, the D moiety, independently at each occurrence in the polymer, comprises a pendant charged group.

In an example, an ionic nanocomposite comprises a plurality of sulfonate-modified silica nanoparticles and the one or more polymer materials comprise or are imidazolium-functionalized polyurethane(s). In an example, the imidazolium-functionalized polyurethane(s) are amorphous (e.g., PEG-ran-PPG based) imidazolium-functionalized polyurethane, a semi-cristalline (e.g., PEG based) imidazolium-functionalized polyurethane, or a combination thereof. In an example, the imidazolium-functionalized polyurethane (s) are amorphous (e.g., PEG-ran-PPG based) imidazolium-functionalized polyurethane and a semi-cristalline (e.g., PEG based) imidazolium-functionalized polyurethane, and the ratio of sulfonate-modified silica nanoparticles to the amorphous (PEG-ran-PPG based) imidazolium-functionalized polyurethane and a semi-cristalline (PEG based) imidazolium-functionalized polyurethane is from 2:1 to 1:2 (e.g., 1:1) and/or the charge balance between the sulfonate groups and imidizolium groups is from 2:1 to 1:2 (e.g., 1:1). In another example, the sulfonate-modified silica nanoparticles are present at 0.1 to 20% by weight (e.g., 10 to 20% by weight) of the nanocomposite and/or the amorphous (PEG-ran-PPG based) imidazolium-functionalized polyurethane and a semi-cristalline (PEG based) imidazolium-functionalized polyurethane are present at a total of (sum of) 99.1 to 80% by weight (e.g., a total of 90% to 80% by weight or 50% by weight) of the nanocomposite.

In an example, the polymer is a polylactide (PLA), a lactide copolymer (e.g., poly[ε-caprolactone-co-D,L-lactide] (P[CL-coLA])), an imidazolium-terminated PLA, or a combination thereof. In an example, an ionic nanocomposite comprises a plurality of sulfonate-modified silica nanoparticles and the one or more polymer materials comprise or are imidazolium-functionalized polylactide(s).

A polymer can have a variety of end groups. A polymer can have end groups resulting from the polymerization reaction used to form the polymer or end groups introduced by post-polymerization functionalization (e.g., so that the functionalized polymers exhibit ionic interactions). Examples of end groups include, but are not limited to, hydroxyl group, alkyl groups, imidazolium groups, ammonium groups, triazolium groups, phosphonium groups, pyridinium groups, and combinations thereof.

An ionic nanocomposite material can have one polymer material (e.g., polymer) or a mixture of polymer materials (e.g., polymers). For example, an ionic nanocomposite comprises two different polymers (e.g., a first polymer where D is an alkyl moiety comprising 2 carbons and a second polymer where D is an alkyl moiety comprising 3 carbons). In an example, an ionic nanocomposite material has a mixture of polymer materials where one or more of the polymer materials is an imidazolium-functionalized (e.g., imidazolium-terminated) polymer and one or more of the polymers is not an imidazolium-functionalized (e.g., imidazolium-terminated) polymer.

A nanocomposite can exhibit desirable properties. Examples of desirable properties include, but are not limited to, stiffness, toughness, stretchability, shape healing properties, healing to damage properties, shape memory properties/behaviors, and combinations thereof. In an example, a nanocomposite exhibits improved stiffness, toughness, stretchability, or a combination thereof in comparison to the polymer material(s) of the nanocomposite alone (in the absence of the nanomaterial). In an example, a nanocomposite exhibits a fixity ratio ($R_f$) of approximately 100 and/or a recovery ratio ($R_r$) of 50% or greater, 60% or greater, 70% or greater, or 75% or greater.

A nanocomposite that exhibits self healing properties can comprise one or more soft polymer materials. Examples of soft polymer materials include, but are not limited to, flexible materials, semicrystalline materials, and amorphous materials. In various examples, a soft material is flexible material(s), semicrystalline material(s), amorphous material(s), or a combination thereof. A semicrystalline soft material has a melting point. An amorphous soft material does not have a melting point. For example, a self-healing nanocomposite has all soft polymer materials. Soft polymer materials can have a Tg of room temperature (e.g., 18° C. to 25° C.) or less. In various examples, a soft polymer materials has a Tg of 25° C. or less, 10° C. or less, 5° C. or less, or 0° C. or less. A soft polymer material (a polymer) can have one or more soft blocks.

A nanocomposite that exhibits shape memory properties (e.g., cold programming shape memory and/or reversible plasticity) can comprise both soft polymer materials and hard polymer materials. Soft materials are as described herein. H-lard polymer materials can have a Tg of greater than room temperature (e.g., 18° C. to 25° C.), rigid, semicrystalline, or a combination thereof. Hard materials can be semicrystalline. A hard polymer material (a polymer) can have one or more hard blocks. A hard polymer can have one or more soft blocks and one or more hard blocks. A nanocomposite that exhibits shape memory properties can comprise soft polymer materials and hard polymer materials. In various examples, the ratio of soft polymer materials to hard polymer materials is from 2:1 to 1:2, including all ratio values therebetween (e.g., 1.8:1, 1.3:1, 1:1.3, and 1:1.8). For example, the ratio of soft polymer materials to hard polymer materials is 1:1 For example, a nanomaterial comprises a 50:50 mixture of two polyurethanes (im-PEG and im-PEG-ran-PPG).

A nanocomposite can comprise one or more hard polymer materials. In various examples, one of more of the hard materials comprises an aromatic segment.

An ionic nanocomposite can have a variety of charge balance values (the ratio of charge between the nanomaterial(s) and polymer(s). For example, the ratio of charge between the nanomaterial(s) and polymer(s) is from 0.1:1 to 4:1. In another example, the ratio of charge between the nanomaterial(s) and polymer(s) is from 0.01:1 to 4:1. In another example, the ratio of charge between the nanomaterial(s) and polymer(s) is from 2:1 to 1:2. In an example, the charge balance is 1:1.

Both the nanomaterial(s) and polymer material(s) are charged (have ionic groups). The nanomaterial(s) and polymer material(s) have opposite charge. For example, the nanomaterial(s) are negatively charged and the polymer material(s) are positively charged, or vice versa.

An ionic nanocomposite (e.g., a film comprising one or more ionic nanocomposite) can have desirable properties. For example, an ionic nanocomposite exhibits a 3 times to 30 times increase in strain at break. In various another examples, an ionic nanocomposite exhibits a 3 times or greater, 5 times or greater, 10 times or greater, 20 times or greater, or 30 times or greater increase in strain at break. For example, an ionic nanocomposite exhibits a 10 times to 100 times increase in toughness. In various other examples, an ionic nanocomposite exhibits a 10 times or greater, 15 times or greater, 20 times or greater, 30 times or greater, 50 times or greater, 75 times or greater, or 100 times or greater increase toughness. For example, an ionic nanocomposite exhibits a 1 times to 5 times increase in stiffness. In various another examples, an ionic nanocomposite exhibits a 1 times or greater, 2 times or greater, 3 times or greater, 4 times or greater, or 5 times or greater increase in stiffness. Without intending to be bound by any particular theory it is considered that increasing the tensile loading rate increases one or more properties that are unique in the present ionic systems. Accordingly it is expected that higher strain rate will provide better tensile performance. When a property of an ionic nanocomposite is said to be improved (e.g., better or greater) it is in comparison to the polymer material component of the ionic nanocomposite in the absence of the nanomaterial.

Without intending to be bound by any particular theory, it is considered that the improvement in stiffness of ionic nanocomposite materials results from the addition of nanomaterial(s) to the polymer material(s) and improvement in toughness and strain at break is related to the formation of the ionic network, which is reversible. It is also considered that these improvements result from the dynamics of the ionic bonds which are more difficult to break at high strain rates.

An ionic nanocomposite (e.g., a film comprising one or more ionic nanocomposite) can exhibit desirable shape-memory characteristics. For example, an ionic nanocomposite (e.g., a film comprising one or more ionic nanocomposite) exhibits shape recovery at room temperature (e.g., 18-25° C.) of 0 to 50% and recovery at a temperature equal to or greater than the melting point of the polymer(s) (e.g., 50° C.) from 50 to 100%. In other examples, a nanocomposite (e.g., a film comprising one or more ionic nanocomposite) comprising only amorphous polymer material(s) (e.g., polymer(s) exhibits recovery at room temperature (e.g., 18-25° C.) of 0 to 100% or 50 to 100%.

An ionic nanocomposite (e.g., a film comprising one or more ionic nanocomposite) can exhibit desirable self-healing characteristics. For example, an ionic nanocomposite (e.g., a film comprising one or more ionic nanocomposite) exhibits self-healing recovery in 4 hour or less at 50° C.

An ionic nanocomposite (e.g., a film comprising one or more ionic nanocomposite) can exhibit desirable storage modulus characteristics. For example, an ionic nanocomposite (e.g., a film comprising one or more ionic nanocomposite) exhibits formation of a plateau at 1 to 3 wt % nanomaterials (e.g., nanoparticles).

An ionic nanocomposite (e.g., a film comprising one or more ionic nanocomposite) can exhibit desirable storage modulus characteristics. For example, an ionic nanocomposite (e.g., a film comprising one or more ionic nanocomposite) exhibits a storage range modulus increase of 1 to 5 decades. Without intending to be bound by any particular theory, it is considered that improved storage modulus of the ionic nanomaterials results from addition of nanomaterial(s) to the polymer material(s) that increases the viscosity of the polymer material(s) and the presence of ionic interactions which allows the formation of a network (which can be described as formation of gel-like structure).

In an aspect, the present disclosure provides methods of making ionic nanocomposites of the present disclosure. For example, a dispersion of nanomaterial(s) (e.g., nanoparticles) in a solvent (e.g., aqueous media (such as, for example, water), THF, DMF, or DMSO) is contacted with polymer material(s) (e.g., water soluble polymer material(s)). In another example, dry nanomaterials(s) is/are extruded with polymer material(s), under conditions such that the polymer material(s) are melted. Optionally, a solvent can be used in the extrusion process.

In an aspect, the present disclosure provides a film comprising one or more ionic nanocomposite material of the present disclosure. The film can be a thin film. The film can be planar or non-planar.

A film can further comprise one or more additional components. For example, a film further comprises a salt. For example, addition of salt provides a conducting film.

In an aspect, the present disclosure provides compositions comprising one or more ionic nanocomposites of the present disclosure. In an example, a composition comprises one or more ionic nanocomposites of the present disclosure.

For example, ionic nanocomposites are used in compositions such as, for example, adhesives, coatings (e.g., paints). Accordingly, in various examples, a composition (e.g., an adhesive composition, a coating composition, such as, for example, a paint) comprises one or more ionic nanocomposites of the present disclosure.

In an aspect, the present disclosure provides uses of ionic nanocomposites of the present disclosure. Ionic nanocomposites can be used in devices, in the elastomer (tire) industry, in energy systems, and in biomedical applications.

For example, ionic nanocomposites are used in devices such as, for example, sensors and actuators. Accordingly, in various examples, a sensor or actuator comprises one or more ionic nanocomposites of the present disclosure (e.g., one or more film of the present disclosure).

For example, ionic nanocomposites are used in biomedical prostheses. Accordingly, in various examples, a biomedical prosthesis comprises one or more ionic nanocomposites of the present disclosure. A nanocomposite with a melting point close to body temperature allows triggering of the shape-memory effect by contact with the body.

For example, ionic nanocomposites are used in articles of manufacture. Accordingly, an article of manufacture comprises one or more ionic nanocomposites of the present disclosure (e.g., a film comprising one or more ionic nanocomposites). An article of manufacture can have any three-dimensional shape.

For example, ionic nanocomposites are used in the tire industry. Accordingly, in various examples, a tire (or tire material) comprises one or more ionic nanocomposites of the present disclosure. The reversible crosslinking of an ionic nanocomposite can give the shape to a tire material (e.g., rubber) rather than vulcanization.

The steps of the methods described in the various embodiments and examples disclosed herein are sufficient to carry out the methods of the present disclosure. Thus, in an embodiment, a method consists essentially of a combination of the steps of the methods disclosed herein. In another embodiment, a method consists of such steps.

The following example is presented to illustrate the present disclosure. It is not intended to limiting in any matter.

Example 1

The following describes the synthesis and characterization of an example of an ionic nanomaterial of the present disclosure.

Experimental Section. Materials. Hexamethylene diisocyanate (HMDI, >98%, Aldrich) and dibutyltin dilaurate (DBTDL, 95%, Sigma) were stored in a glovebox. Polyethylene glycol (PEG, 2000 g/mol, Sigma), poly(ethylene glycol-ran-polypropylene glycol) (PEG-ran-PPG, 2500 g/mol, Sigma), 2,2-bis(bromomethyl)propane-1,3-diol (BBPDO, 98%, Sigma), Ludox HS 30 colloidal silica (mean diameter 18 nm, Aldrich), 3-(trihydroxysilyl)-1-propane sulfonic acid (SIT, 40 wt %, Gelest), sodium hydroxide solution (1 M, Aldrich), 1-methyl-imidazole (99%, Aldrich), anhydrous tetrahydrofuran (THF, >99.8%, packaged under argon, Alfa Aesar), N,N-dimethylformamide (DMF, >99.7%, packaged under argon, Alfa Aesar), dialysis tubing (Spectra/Por RC Biotech Membrane, 15K MWCO, 16 mm flat width) and ion exchange resin (Dowex, HCR-W2 ion exchange resin) were purchased as indicated and used without further purification.

Synthesis of Imidazolium-Based Diol.

1 eq. of BBPDO and 2 eq. of 1-methyl-imidazole were dissolved in dry THF into a glass flask and refluxed at 65° C. for 24 h under stirring. After reaction, the imidazolium-based diol was recovered by solvent evaporation under vacuum (yield≈83%, $^1$H NMR (DMSO, δ, ppm): 3.4 (4H, s, CH$_2$OH), 3.73 (6H, s, CH$_3$), 3.87 (4H, s, —N—CH$_2$—), 5.14 (2H, s, OH), 7.18 and 7.34 (2H and 2H, s, —N—CHCH—N—), 8.18 (2H, s, —N—CH—N—)).

Synthesis of Imidazolium-Functionalized Polyurethanes (Im-PEG or Im-PEG-Ran-PPG).

1 eq. of either semi-crystalline PEG or amorphous PEG-ran-PPG and 0.1 eq. of the imidazolium-based diol synthesized above were dissolved in dry DMF in a glass flask. Then, 1.2 eq. of HMDI and catalytic amounts of DBTDL were subsequently added to the solution under stirring. The polymerization was performed at 60° C. for 6 h under a nitrogen atmosphere. Finally, the imidazolium-functionalized polyurethane was recovered by precipitation into a 10-fold excess of diethyl-ether, followed by filtration and drying under vacuum (im-PEG: yield≈98%, $M_n$≈27.200 g/mol, Đ≈1.5; im-PEG-ran-PPG: yield≈98%, $M_n$≈23.000 g/mol, Đ≈1.4; $^1$H NMR (DMSO, δ, ppm): 8.2 (2H, s, —N—CH—N—) confirmed the incorporation of imidazolium moieties into the polyurethane molecules).

Sulfonate Functionalization of Nanosilica.

Sulfonate functionalized silica nanoparticles were prepared following a previously reported method. Briefly, Ludox HS 30 colloidal silica (3 g) was diluted in a flask with deionized water (22 ml). In another flask, 3-(trihydroxysilyl)-1-propane sulfonic acid (4 g) was diluted with deionized water (20 ml). The colloidal silica suspension was slowly added to the SIT suspension, while stirring vigorously. To the mixture, a solution of sodium hydroxide (1 M) was added dropwise until a pH of about 5 was reached. The entire solution was then heated to 70° C. and stirred vigorously for 24 h. After that, the suspension was cooled to room temperature and placed into dialysis tubing and dialyzed against deionized water for 3 days while changing the water twice a day. After dialysis, the functionalized silica solution was run through an ion exchange column to remove Na$^+$ ions and fully protonate the surface sulfonate groups. A suspension of sulfonated nanosilica at 5 wt % was prepared with deionized water for further use (d≈17±5 nm, $M_{SO_3H}$≈1 mmol, $R_{organic}$≈24%).

Preparation of Ionic Nanocomposites.

Semi-crystalline im-PEG and amorphous im-PEG-ran-PPG at 50/50 wt % ratio were dissolved in deionized water to a concentration of 10 wt %. Then, the sulfonated silica suspension (5 wt %) was added to the polymer solution under stirring and stirred for an additional 3 h. The resulting solution was sonicated and placed in a vacuum oven for drying until all the water was removed. Thin films of the resulting hybrids were prepared by compression-molding at 60° C. for 3 min.

Characterization Techniques.

Proton nuclear magnetic resonance ($^1$H NMR) spectra were recorded in DMSO using a Bruker AMX-400 apparatus at 400 MHz. Size-exclusion chromatography (SEC) was performed in THF at 35° C. using an Agilent liquid chromatograph equipped with an isocratic HPLC pump G1310A (flow rate: 1 mL/min), autosampler G1329A (loop volume: 100 μL, solution concentration: 1 mg/mL), and three columns: a guard column PLgel 10 m and two columns PLgel mixed-B 5 im. Molecular weight and molecular weight distribution were calculated by reference to a relative calibration curve made of polystyrene standards. Thermal gravimetric analysis (TGA) was performed using a TGA Q500 from TA Instruments at a heating rate of 20° C./min under nitrogen flow. Dynamic Light Scattering (DLS) was carried out on samples in water (concentration of ca. 1 wt %) at 25° C. using a Malvern Zetasizer. Rheological measurements were performed using an Anton Paar Physica Modular Compact Rheometer 501 (MCR-501). A cone and plate system was used with a 25 mm diameter. All measurements were performed at 60° C. with a strain of 1% to ensure that the deformations are in the linear viscoelastic regime. Tensile tests were performed according to ASTM D638 using a Zwick universal tensile testing machine (Ulm, Germany). Transmission electron microscopy (TEM) was carried out using a FEI Tecnai T12 Spirit Twin TEM/STEM microscope operated at 120 kV. Samples were cryo-microtomed at −100° C. with a Leica UCT microtome.

Shape-Memory Testing Reversible Plasticity and Strain Recovery Evolution.

Samples for shape-memory testing were cut from compression-molded thin films into rectangular shape-memory specimens of ca. 30×5×0.2 mm. Dynamic mechanical thermal analyses (DMTA) on these specimens were performed under ambient atmosphere using a strain-controlled DMTA Q800 apparatus from TA Instruments in a film tension mode. The reversible plasticity shape-memory was characterized using the following four-step sequence: 1) deformation: the sample is first stretched at room-temperature (i.e. 20° C.) to a strain of 200% at a rate of 20%/min; 2) fixing in place: the sample is held at 200% strain for 10 min to allow stress relaxation; 3) unloading: the stress/force is released within 3 min, after which a large percentage of plastic deformation remained; and 4) heating and recovery: the sample is heated to 50° C. at a rate of 2° C./min and then ramped back to 20° C. to complete the cycle. The reversible plasticity shape-memory behavior is characterized by the elastic recovery $R_{elas}$, the plastic recovery $R_{plas}$ and the total recovery $R_{tot}$ ratios. They were calculated using the following equations:

$$R_{elas} = \frac{\varepsilon_{ext} - \varepsilon_{un}}{\varepsilon_{ext}} \quad R_{plas} = \left(\frac{\varepsilon_{un} - \varepsilon_f}{\varepsilon_{ext}}\right) \quad R_{tot} = R_{elas} + R_{plas}$$

Where $\varepsilon_{ext}$ is the strain obtained before the constant strain was released, $\varepsilon_{un}$ is the strain directly after unloading at room temperature, and $\varepsilon_f$ is the strain obtained directly after heating the sample. The actuation program was repeated three times and good reproducibility was observed.

Self-Healing Experiments Scratch Recovery.

Surface scratches with residual depth of ca. 500 μm and width of ca. 160 μm, respectively were made at 25° C. through the samples. Qualitative scratch recovery after heating at 50° C. was evaluated using an optical microscope (OLYMPUS BX51) over time.

Results and Discussion.

The new nanocomposites leverage the electrostatic interactions of imidazolium-functionalized polyurethane (im-PU) and surface-modified sulfonated silica nanoparticles (nanosilica-SO$_3$H) (FIG. 1). The close location of the cationic imidazolium rings to the anionic sulfonate groups is the result of optimizing Coulomb interactions. Building on the double-network principle, the new nanocomposites are made of a two-component system: the semi-crystalline im-PEG ionomer and the amorphous im-PEG-ran-PPG ionomer at 50/50 wt % ratio (noted as im-PU), ionically bonded to the nanosilica-SO$_3$H. The nanocomposites combine the reinforcing effects of silica nanoparticles with the reversibility endowed by the presence of ionic crosslinks in the system.

Figure 2:
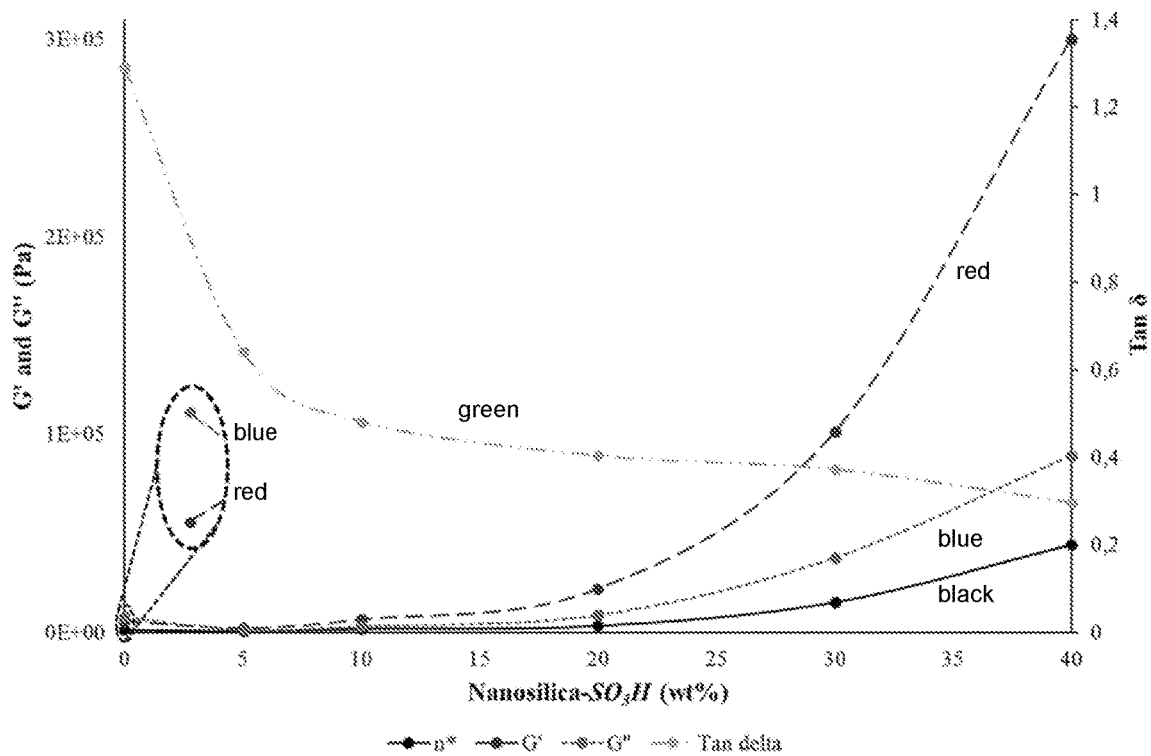
FIG. 2. Complex viscosity $\eta^*$ (solid line (black)), storage modulus G' (long dash line (red)), loss modulus G" (short dash line (blue)) and damping factor Tan δ (broken dash line (green)) at frequency ν of 1 Hz (similar behavior at other frequencies) of nanohybrids as a function of nanosilica-$SO_3H$.
Figure 8:
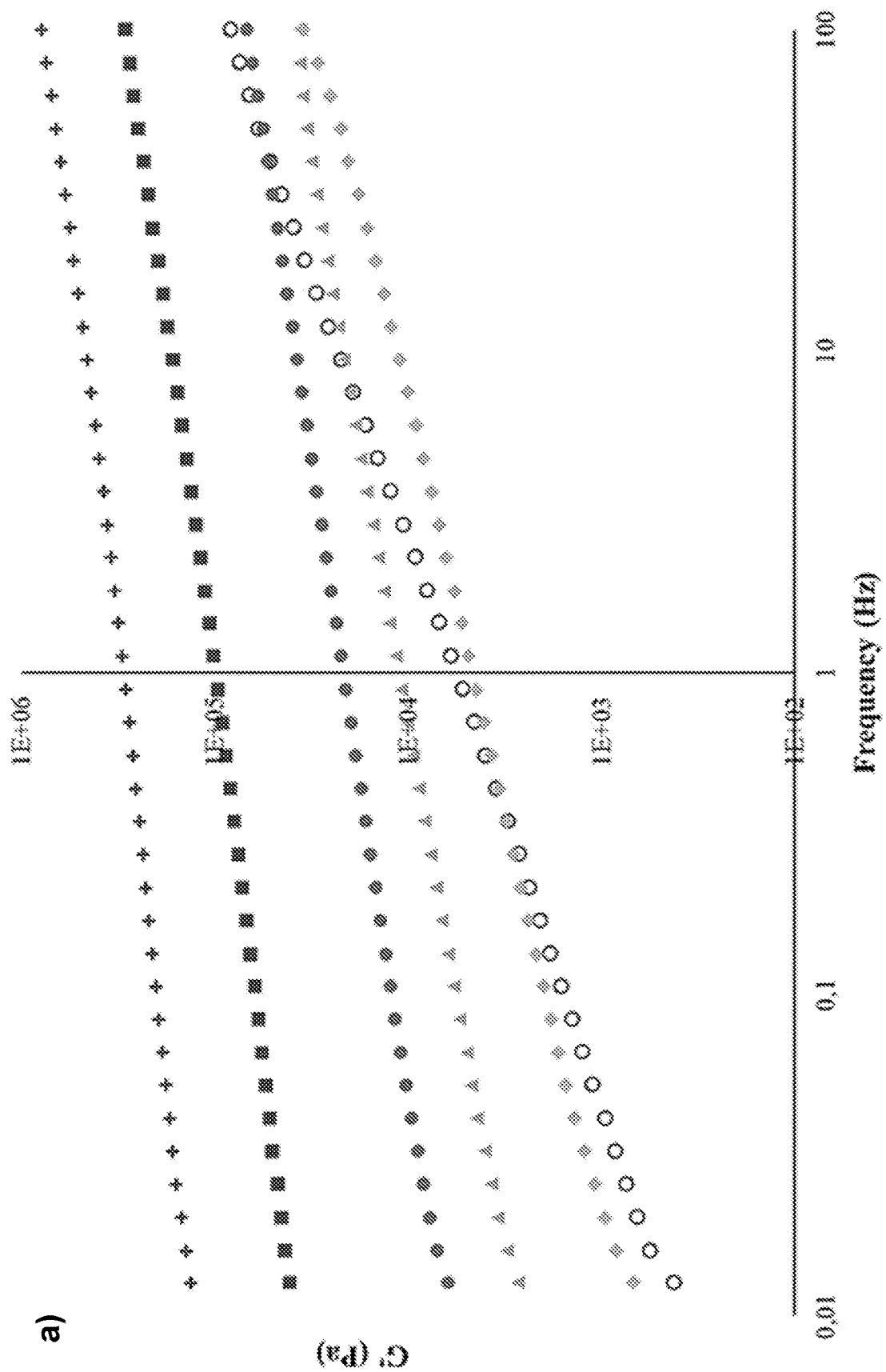
FIG. 8. Storage modulus G' (a) and complex viscosity $\eta^*$ (b) as a function of frequency ν, of im-PU (open circles) and nanohybrids containing 5 wt. % (diamonds), 10 wt. % (triangles), 20 wt. % (filled circles), 30 wt. % (squares) and 40 wt. % (crosses) nanosilica-$SO_3H$.
Figure 8:
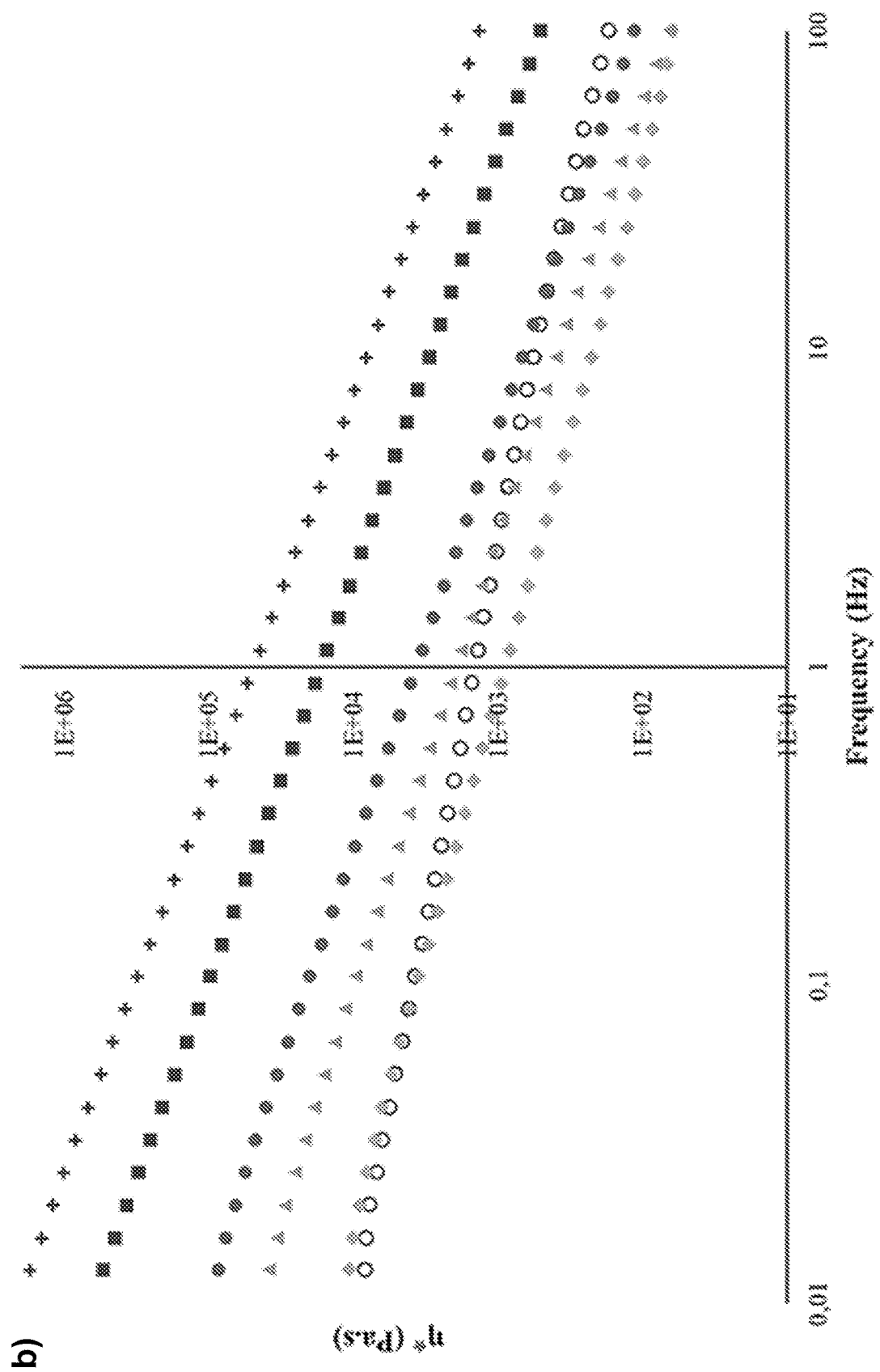

Rheologically, the materials transition from liquid-like to solid-like behavior as the concentration of nanosilica-SO$_3$H increases (FIG. 2). At low frequencies, the addition of nanoparticles leads to a significant increase in the storage modulus and related complex viscosity (FIG. 8). This well-known behavior is directly related to the development of an extensive 3D network of the silica nanoparticles within the material. The Winter-Chambon criterion can be used to detect the onset of a percolation threshold. While 20 wt % of silica nanoparticles is required for charge balance (1:1 imidazolium-sulfonate ratio), the percolation threshold is readily detected from ca. 10 wt %, where the moduli flatten at low frequencies reaching a plateau and the tan δ become frequency independent.

Figure 3:
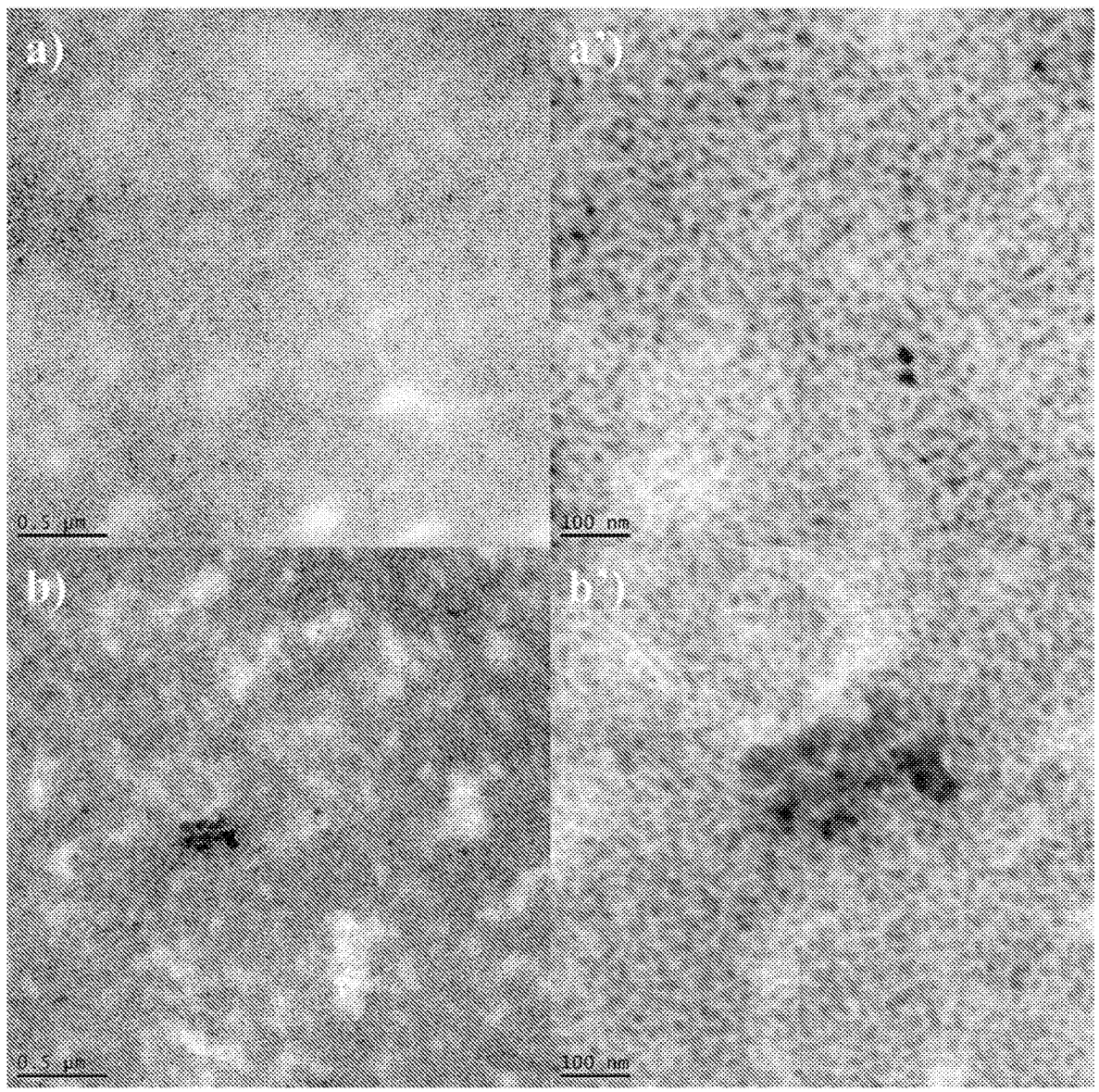
FIG. 3. TEM micrographs of nanohybrids containing 20 wt % (a and a') and 40 wt % (b and b') of nanosilica-$SO_3H$.

TEM studies show the nanocomposites to be well dispersed, a typical challenge of conventional nanoparticle based composites (FIG. 3). Despite the high silica loadings (20 wt %), the hybrids show an exquisite level of dispersion, which were attributed to the presence of electrostatic interactions in the system. Recall that charge balance requires a 1:1 imidazolium-sulfonate ratio, which corresponds to 20 wt % of silica. At higher silica loadings and once that level of charge balance is exceeded, some aggregation is observed reinforcing the critical importance of ionic (chemical) interactions for dispersion.

Figure 4:
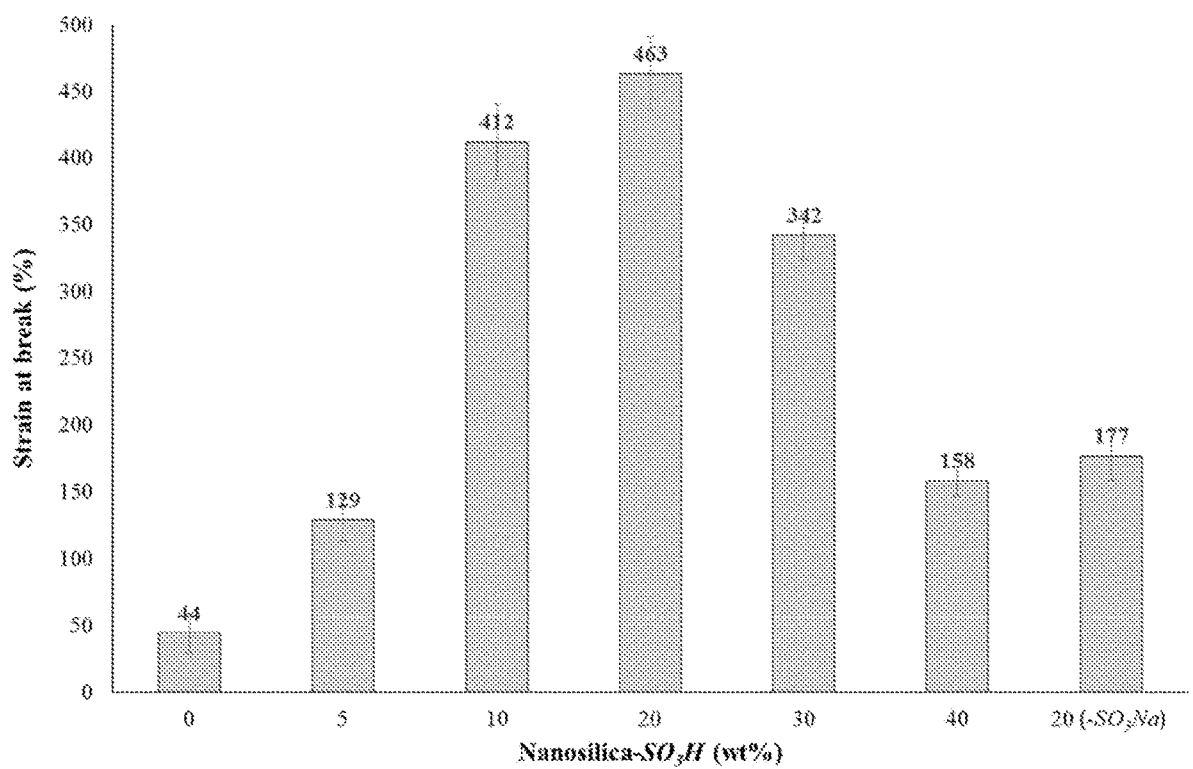
FIG. 4. Strain at break of nanohybrids upon the addition of nanosilica-$SO_3H$.
Figure 5:
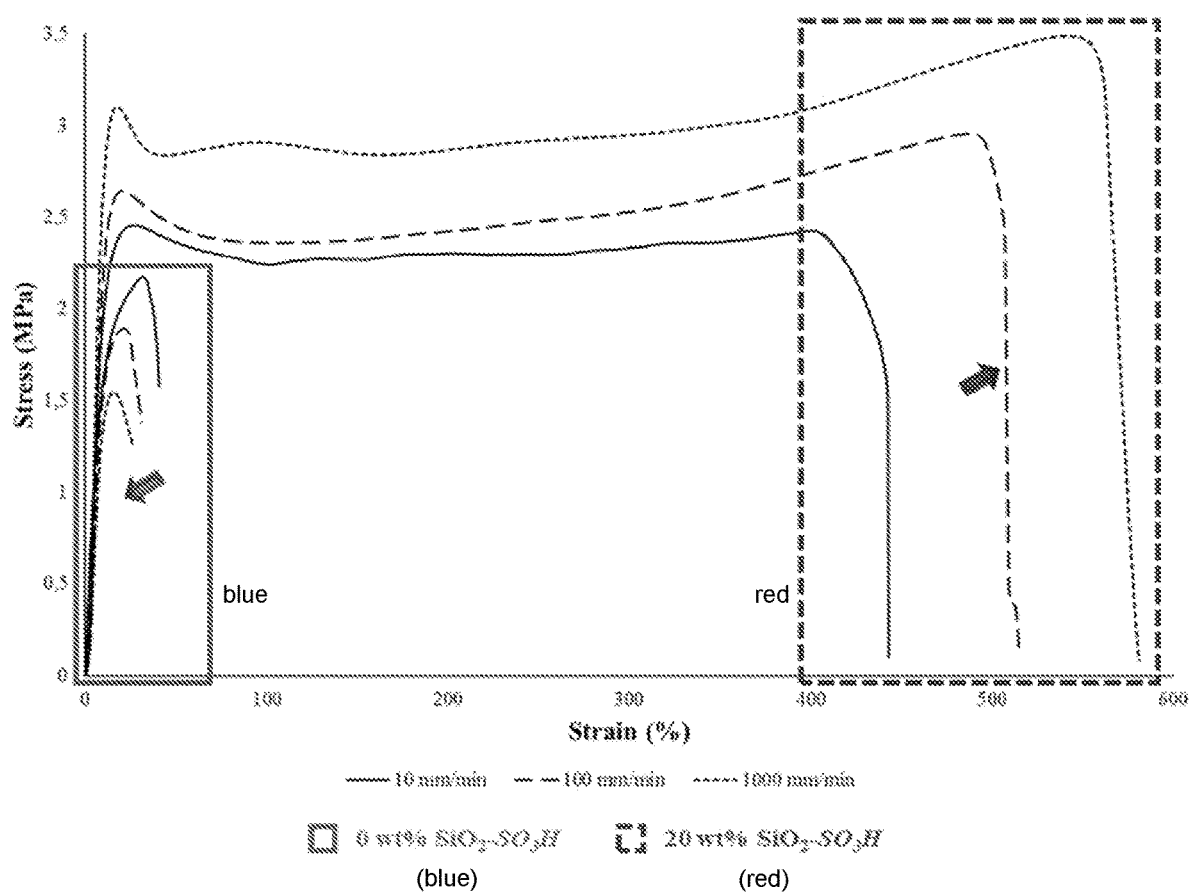
FIG. 5. Typical stress-strain curves of im-PU (solid square (blue)) and the corresponding nanohybrid containing 20 wt % of nanosilica-$SO_3H$ (dashed square (red)) upon the tensile loading rate: 10 mm/min (solid line), 100 mm/min (long dash line) and 1000 mm/min (short dash line).

The presence of ionic interactions endows the hybrids with an unpreceded set of properties. The nanohybrids show significant enhancements in modulus, toughness and strain at break compared to the neat polymer (FIG. 4 and Table 2). For instance, loading 20 wt % of silica into im-PU leads to an 11-fold increase in strain at break (463% vs. 44%) together with a 40-fold increase in tensile toughness (12 MJ/m$^3$ vs. 0.3 MJ/m$^3$) and a 2.5-fold increase in modulus (27 MPa vs. 12 MPa) compared to the neat polymer. The improvements in mechanical properties seem to reach a plateau at 20 wt %, which coincides with the silica to polymer ratio required for charge balance the system. It is worth noting that higher silica loadings do not lead to better performance. Recall that loadings above 20 wt % do not lead to more imidazolium-sulfonate interactions, which it is believed are at the core of the properties improvement. Likewise, replacing the nanosilica-SO$_3$H with its sodium form (—SO$_3$Na) decreases the extent of electrostatic interactions in the system. As a result, a drop in the mechanical properties occurs (e.g. 177% vs. 463% strain at break at 20 wt %), confirming the critical nature of having the ionic motif present. Interestingly, the tensile behavior of the materials dramatically changes with the loading rate (FIG. 5 and Table 3). The strain at break for the neat im-PU decreases as the loading rate increases. In contrast, higher levels of strain not only are sustained in the nanocomposites but they also show better performance under high loading rate. For instance, increasing the loading rate from 10 to 1000 mm/min results in higher strain at break (558% vs. 463%) and tensile toughness (19 MJ/m$^2$ vs. 12 MJ/m$^2$) for the 20 wt % nanosilica-SO$_3$H nanocomposite. In an attempt to rationalize this unusual behavior, it was hypothesize that the ionic interactions between imidazolium-sulfonate groups are dynamic, i.e. dissociate and reform under deformation at low loading rates. Since the strength of such electrostatic junctions is weaker than those of covalent bonds, the progressive breakage of these electrostatic linkages first followed by the covalent ones drive the nature of the stress-strain curves at low loading rates. This mechanism gives access to highly stretchable and tough materials (FIG. 4 and FIG. 5). Under high loading rates, it is believed that these dynamic bonds do not break as much and do not relax in the time frames of the experiment leading to better mechanical response upon yielding consistent with previously published studies. These insights are particularly prominent in controlling the properties of the material at large strains regime, which is essential for fracture properties.

Figure 6:
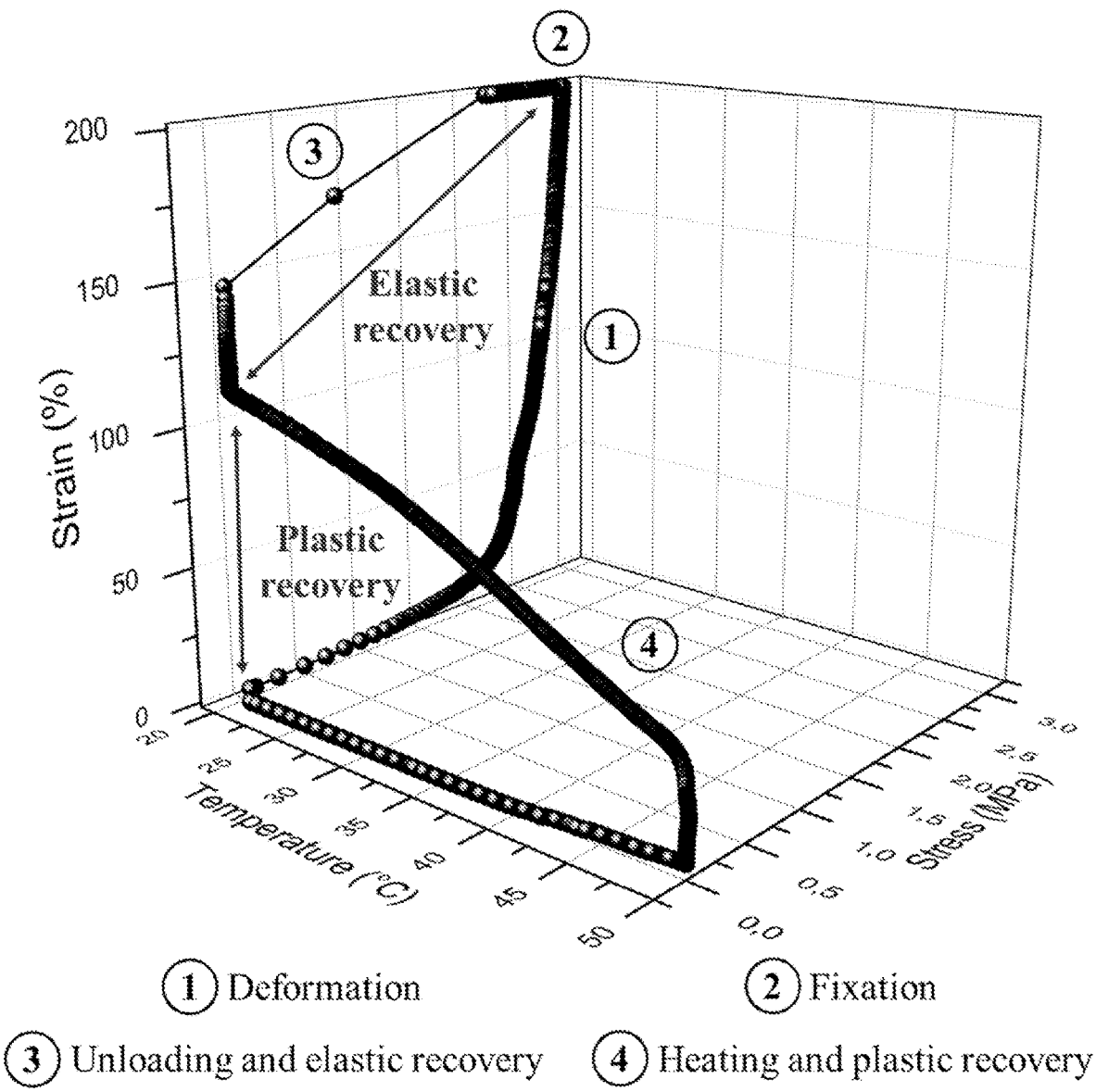
FIG. 6. Reversible plasticity shape-memory of nanohybrids containing 20 wt % of nanosilica-$SO_3H$.

Due to the reversible nature of electrostatic imidazolium-sulfonate interactions, the resulting materials can recover their initial state after experiencing a large deformation (FIG. 6). Defined as reversible plasticity shape memory materials, they show high deformation at room temperature and full-recovery through both elastic (i.e. pre-yield strain) and plastic (i.e. post-yield strain) restoring forces, if placed above the melting temperature of the system ($T_m \approx 40°$ C.). During shape-memory testing, the samples were stretched to a given strain of 200% by applying a constant deformation. This deformation leads to a large internal stress stored in a temporary pre-deformed shape. The subsequent release of the residual stress thereby drives the elastic shape recovery thanks to the entropic relaxation of the polymer chains, after which a large percentage of plastic deformation remains. The nanocomposite is finally heated at 50° C. (i.e. above its $T_m$) to trigger the plastic shape recovery, allowing complete recovery. In this regard, Table 1 summarizes the reversible plasticity shape-memory performance of the nanocomposites quantified by DMTA. From these measurements, neat im-PU only sustained low and irreversible deformation during the shape-memory process. In contrast, the nanocomposites ensured significant reversibility even after substantial deformations. For instance, the 20 wt % nanosilica-SO$_3$H nanocomposite achieved a full shape-recovery (i.e. $R_{tot}$=100%) through both elastic and plastic contributions of $R_{elas}$=45% and $R_{plas}$=55%, respectively. As discussed above, this particular composition is the most efficient imidazolium-sulfonate ratio for charge balancing, leading to a percolated network and a better shape-memory performance.

Figure 7:
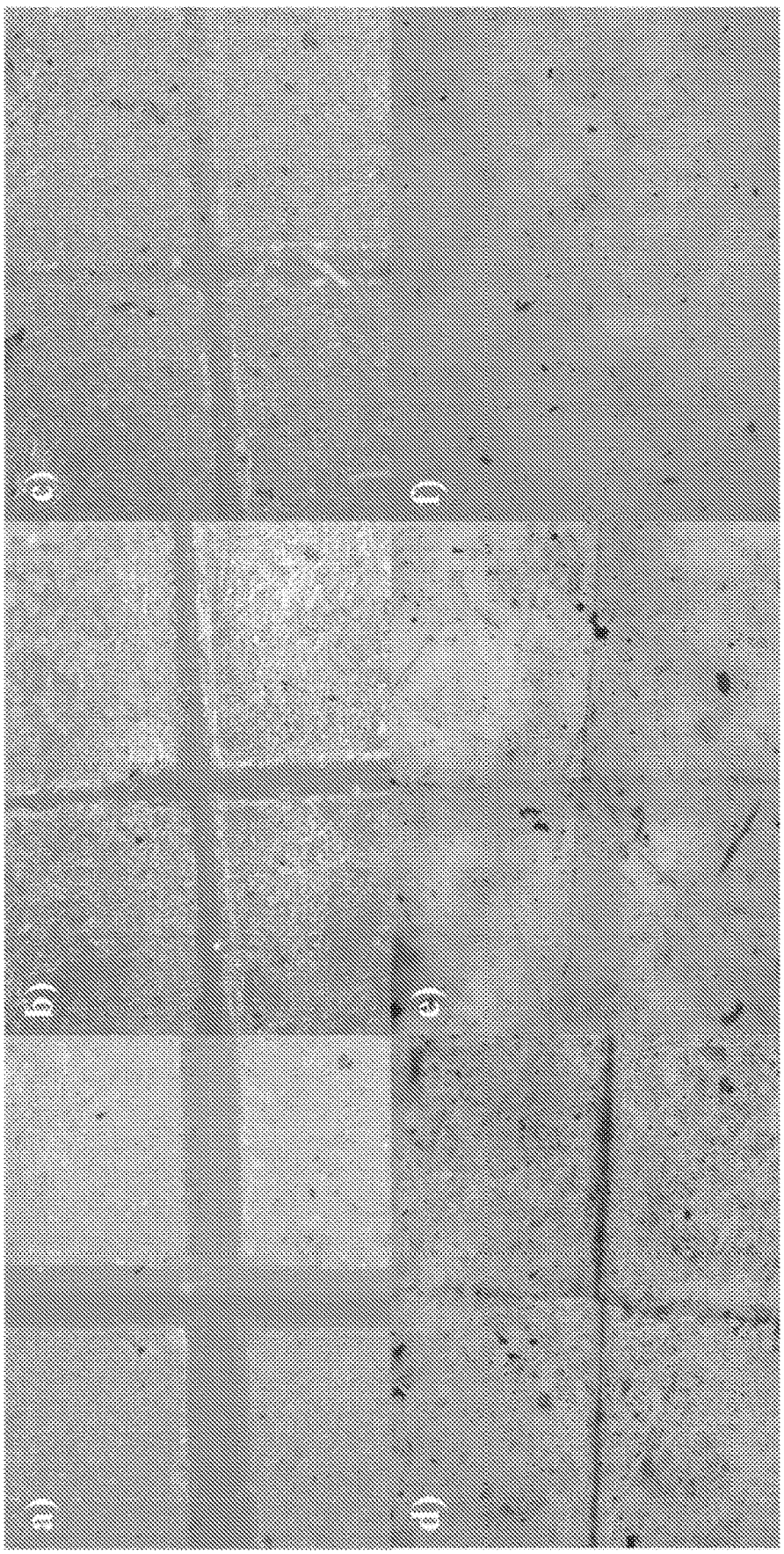
FIG. 7. Self-healing abilities of nanohybrid containing 20 wt % of nanosilica-$SO_3H$ upon the time at 50° C.: 0 h (a), 1 h (b), 2 h (c), 3 h (d), 4 h (e) and 5 h (f).

In the instant design, it was envisioned that the dynamic and reversible imidazolium-sulfonate bonding should also afford self-healing properties. In this respect, nanocomposites containing 20 wt % of nanosilica-SO$_3$H showed remarkable self-healing ability (FIG. 7). After deeply scratching through the sample with a razor blade and gently bringing the two cut pieces back into contact, the two faces spontaneously self-healed upon heating at 50° C. Longer heating times lead to better self-healing, ensuring a full scratch recovery after ca. 4 h. Most approaches to self-healing materials require systems with enough mobility at the molecular level, which usually impacts their inherent stiffness. It is worth noting that the crystallinity of the matrix together with the high silica loading arrests extensive mobility in the resulting nanocomposites. Nevertheless, the instant systems uniquely combine enhanced modulus with improved toughness, reversible deformation and intrinsic self-healing properties.

Ionic nanocomposites based on imidazolium-functionalized polyurethanes (im-PU) and surface-modified sulfonated silica nanoparticles (nanosilica-SO$_3$H) were synthesized and their multi-responsive and adaptable properties were characterized. Rheologically, the materials transition from liquid-like to solid-like behavior as the concentration of nanosilica-SO$_3$H increases, attesting for the establishment of an extensive 3D particles network within the system. The presence of ionic interactions endows the materials with good dispersion of the nanoparticles in the polymer despite the high silica loadings. As a result, stiff, tough and highly stretchable nanocomposite materials are obtained. For instance, loading 20 wt % of nanosilica-SO$_3$H led to well-dispersed hybrids with an 11-fold increase in strain at break, a 40-fold increase in tensile toughness and a 2.5-fold increase in stiffness compared to the neat polymer. Surprisingly, higher levels of strain not only are sustained in the nanocomposites but they also show better response at larger loading rates. Thanks to the dynamics and reversible nature of the ionic imidazolium-sulfonate links present in the system, the nanocomposites further demonstrate complete reversibility upon heating. Defined as reversible plasticity shape memory, they fully recover their initial state even after substantial deformations. Similarly, the nanocomposites not only trigger reversible deformation but also exhibit remarkable self-healing properties. All in all the nanocomposites combine unique features leading to an attractive mechanical response including reversible plasticity shape-memory and intrinsic self-healing characteristics. The unique mechanical response is attributed to the system combining the ionic interactions of molecular systems with the reinforcement ability of nanoparticles in nanocomposites.

TABLE 1

Reversible plasticity shape-memory performances of nanohybrids upon the addition of nanosilica-SO$_3$H.

| SiO$_2$—SO$_3$H content (wt %) | $R_{elas}$ (%) | $R_{plas}$ (%) | $R_{tot}$ (%) |
|---|---|---|---|
| 0 | * | * | * |
| 5 | * | * | * |
| 10 | 34 | 38 | 72 |
| 20 | 45 | 55 | 100 |

TABLE 1-continued

Reversible plasticity shape-memory performances of nanohybrids upon the addition of nanosilica-SO$_3$H.

| SiO$_2$—SO$_3$H content (wt %) | $R_{elas}$ (%) | $R_{plas}$ (%) | $R_{tot}$ (%) |
|---|---|---|---|
| 30 | 43 | 37 | 80 |
| 40 | * | * | * |

* Not determined - nanohybrids did not reach 200% of strain.

TABLE 2

Tensile characteristics of nanohybrids upon the addition of nanosilica-SO$_3$H.

| SiO$_2$—SO$_3$H content (wt. %) | E (MPa) | $\varepsilon_b$ (%) | TT (MJ/m$^3$) |
|---|---|---|---|
| 0 | 12 ± 2 | 44 ± 15 | 0.3 ± 0.1 |
| 5 | 31 ± 5 | 129 ± 16 | 3 ± 0.5 |
| 10 | 30 ± 1 | 412 ± 28 | 10 ± 1 |
| 20 | 27 ± 2 | 463 ± 28 | 12 ± 1 |
| 30 | 29 ± 5 | 342 ± 18 | 8 ± 1 |
| 40 | 24 ± 2 | 158 ± 11 | 6 ± 1 |
| 20 (—SO$_3$Na) | 25 ± 5 | 177 ± 19 | 3 ± 0.5 |

E: Young's modulus;
$\varepsilon_b$: strain at break;
TT: tensile toughness.

TABLE 3

Tensile characteristics of nanohybrids upon the tensile loading rate.

| SiO$_2$—SO$_3$H content (wt. %) | Tensile speed (mm/min) | E (MPa) | $\varepsilon_b$ (%) | TT (MJ/m$^3$) |
|---|---|---|---|---|
| 0 | 10 | 12 ± 2 | 44 ± 15 | 0.3 ± 0.1 |
| 0 | 100 | 20 ± 5 | 30 ± 5 | 0.3 ± 0.1 |
| 0 | 1000 | 19 ± 2 | 27 ± 3 | 0.3 ± 0.1 |
| 20 | 10 | 27 ± 2 | 463 ± 28 | 12 ± 1 |
| 20 | 100 | 25 ± 2 | 539 ± 21 | 17 ± 3 |
| 20 | 1000 | 24 ± 2 | 558 ± 11 | 19 ± 1 |

E: Young's modulus;
$\varepsilon_b$: strain at break;
TT: tensile toughness.

Example 2

The following describes the synthesis and characterization of an example of an ionic nanomaterial of the present disclosure.

Commercial polylactide (PLA) was converted and endowed with shape-memory properties by synthesizing ionic hybrids based of PLA with imidazolium-terminated PLA and poly[ε-caprolactone-co-D,L-lactide] (P[CL-co-LA]) and surface-modified silica nanoparticles. The electrostatic interactions assist with the silica nanoparticle dispersion in the polymer matrix. Since nanoparticle dispersion in polymers is a perennial challenge and has prevented nanocomposites from reaching their full potential in terms of performance it is expected this new design will be exploited in other polymers systems to synthesize well-dispersed nanocomposites. Rheological measurements of the ionic hybrids are consistent with the formation of a network. The ionic hybrids are also much more deformable compared to the neat PLA. More importantly, they exhibit shape-memory behavior with fixity ratio $R_f \approx 100\%$ and recovery ratio $R_r = 79\%$, for the blend containing 25 wt % im-PLA and 25 wt % im-P[CL-co-LA] and 5 wt % of SiO$_2$—SO$_3$Na. Dielectric spectroscopy and dynamic mechanical analysis show a second, low-frequency relaxation attributed to strongly immobilized polymer chains on silica due to electrostatic interactions. Creep compliance tests further suggest that the ionic interactions prevent permanent slippage in the hybrids which is most likely responsible for the significant shape-memory behavior observed.

Figure 16:
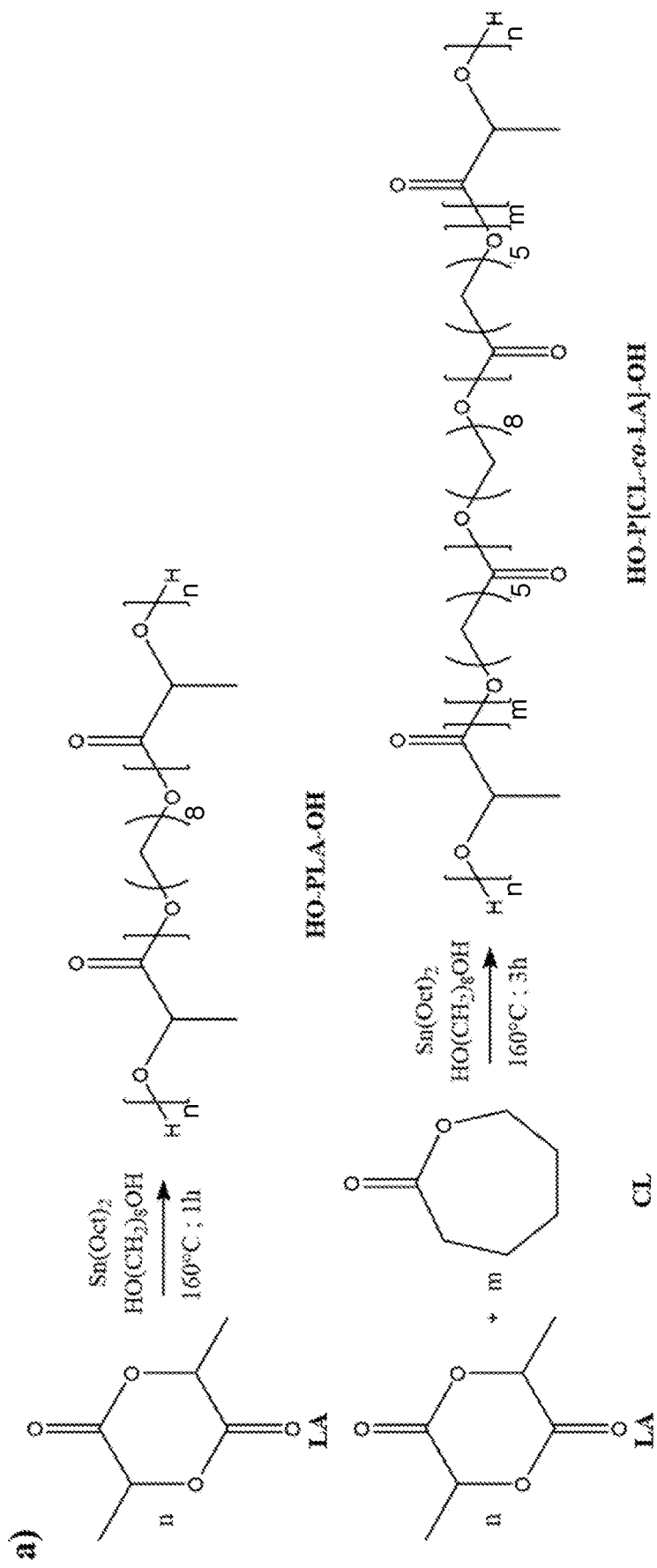
FIG. 16. Synthesis reactions for a) PLA and P[CL-co-LA] synthesized via ring-opening polymerization catalyzed by 1,8-octanediol and tin(II) octanoate; b) synthesis of 1-methyl-3-propionic acid-imidazolium bromide; and c) end-functionalization of PLA and P[CL-co-LA] with imidazolium.
Figure 16:
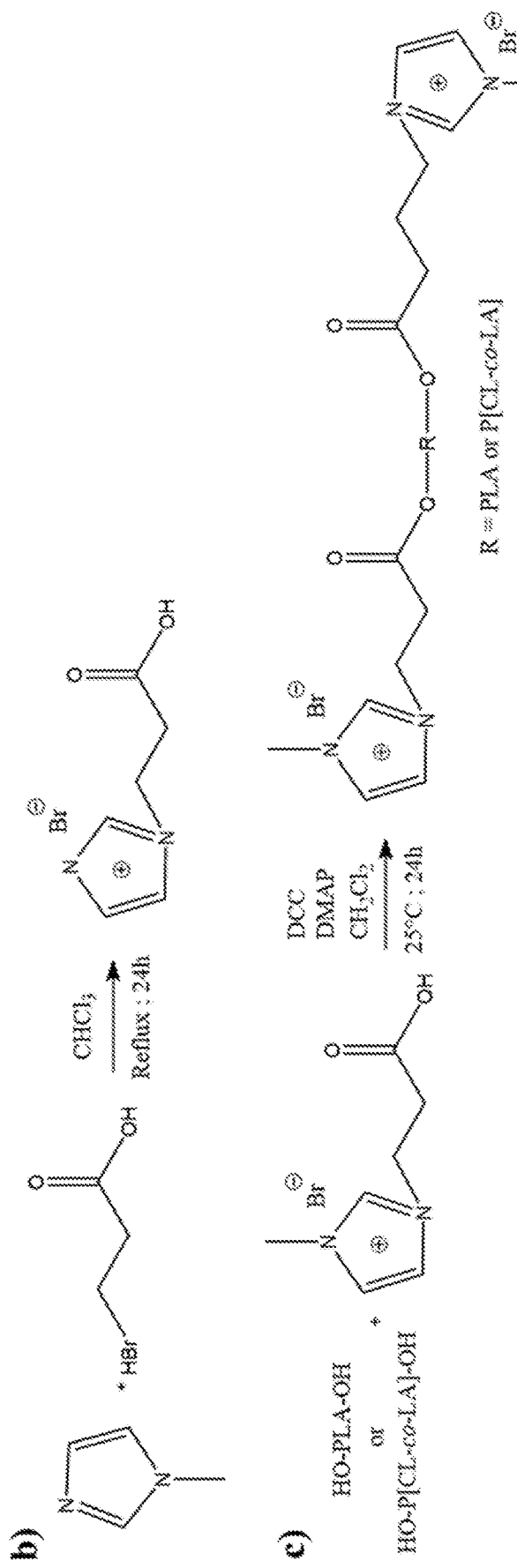

In this example, reversible ionic bonds were leveraged with the reinforcement effect of nanoparticles to demonstrate new hybrid systems with unique responses. The design is based on hybrids of blends of imidazolium-terminated oligomers of glassy polylactide (PLA) and rubbery poly[ε-caprolactone-co-D,L-lactide] (P[CL-co-LA]) (referred to as im-PLA and im-P[CL-co-LA]) dispersed in commercial PLA with sulfonate-modified silica ($SiO_2$—$SO_3Na$) (the synthesis is schematically shown in FIG. 16). The reversible/dynamic nature of the ionic interactions endows the hybrids with unique behavior and transformed commercial PLA from a non-responsive to a shape-memory polymer. This is extremely significant, since PLA demonstrating shape-memory is very attractive especially for medical implants, but only a limited shape-memory effect (i.e. relatively low recovery strain) for unmodified PLA has been demonstrated up to now. It is expected that the design demonstrated in this example (i.e. systems based on ionic hybrids) is not limited to PLA and can be exploited more generally to endow other unresponsive polymers with high degree of shape-memory behavior.

Experimental Section. Materials. ε-Caprolactone (99%, Acros) was dried for 48 h over calcium hydride and distilled under reduced pressure. L,L-lactide or D,L-lactide (>99.5%, Purac) was stored in a glove box. 1,8-octanediol (98%, Aldrich) was dried over molecular sieves (4 Å). Tin(II) octanoate ($Sn(Oct)_2$) (95%, Aldrich) was used as a solution in dry toluene (0.01 M). A commercially available extrusion-grade PLA (NatureWorks 4032D) especially designed for production of biaxially oriented films was used as received ($\overline{M}_n$=133,500±5,000 g/mol, D=1.94±0.06 as determined by size-exclusion chromatography, 1.4±0.2% D-isomer content as determined by the supplier). Ludox HS 30 colloidal silica (mean diameter 18 nm, Aldrich), 3-(trihydroxysilyl)-1-propane sulfonic acid (SIT, 40 wt %, Gelest), sodium hydroxide solution (1 M, Aldrich), 1-methyl-imidazole (99%, Aldrich), 3-bromopropionic acid (97%, Aldrich), N,N'-dicyclohexyl-carbodiimide (99%, Aldrich), 4-(dimethylamino)pyridine (99%, Aldrich), chloroform ($CHCl_3$, >99.9%, Aldrich), dichloromethane ($CH_2Cl_2$, >99.8%, Aldrich), heptane (>99%, Aldrich), diethyl ether (>99%, Aldrich), methanol (>99.8%, Aldrich), dimethylformamide (DMF, >99%, Aldrich) and dialysis tubing (Spectra/Por RC Biotech Membrane, 15K MWCO, 16 mm flat width) were obtained commercially and used without further purification.

Synthesis of 1-methyl-3-propionic acid-imidazolium bromide.

1.1 eq. of 3-bromopropionic acid and 1 eq. of 1-methyl-imidazole were dissolved in dry $CHCl_3$ into a glass reactor. The mixture was refluxed at around 60° C. for 24 h with stirring. The crude product was recovered after precipitation into a 10-fold excess of diethyl-ether, filtration and drying under vacuum (yield≈87%, $^1$H NMR ($CDCl_3$, δ, ppm): 2.1 (2H, t, $CH_2COOH$), 3.1 (3H, s, $CH_3$), 3.65 (2H, t, —N—$CH_2$—), 6.7 and 6.8 (1H and 1H, s, —N—CHCH—N—), 8.15 (1H, s, —N—CH—N—)).

Synthesis of Rigid PLA and Soft P[CL-Co-LA].

The synthesis of PLA and P[CL-co-LA] was carried out by bulk ring-opening polymerization (ROP) of L,L-lactide or ε-caprolactone/D,L-lactide (30 mol %) and promoted by 1,8-octanediol and tin(II) octanoate. The initial molar ratio of [alcohol]/[tin(II) octanoate] and [monomer]/[alcohol] was 100 and 200, respectively. The synthesis of PLA and P[CL-co-LA] was carried out for 1 h and 3 h, respectively in a reactor (200 cc) at 160° C. The reaction was quenched using an ice bath. The crude product was dissolved in a minimum volume of $CHCl_3$, followed by precipitation into a 10-fold excess of heptane. The polymers were recovered after filtration and drying under vacuum (PLA: Yield≈99%, $M_n$≈30,500 g/mol, D≈1.7, Tg≈58° C., $T_m$≈169° C.; P[CL-co-LA]: Yield≈99%, $M_n$≈30,000 g/mol, D≈1.7, CL/LA≈72/28 mol %, Tg≈−37° C., no $T_m$).

Imidazolium-Terminated PLA and P[CL-Co-LA].

Figure 17:
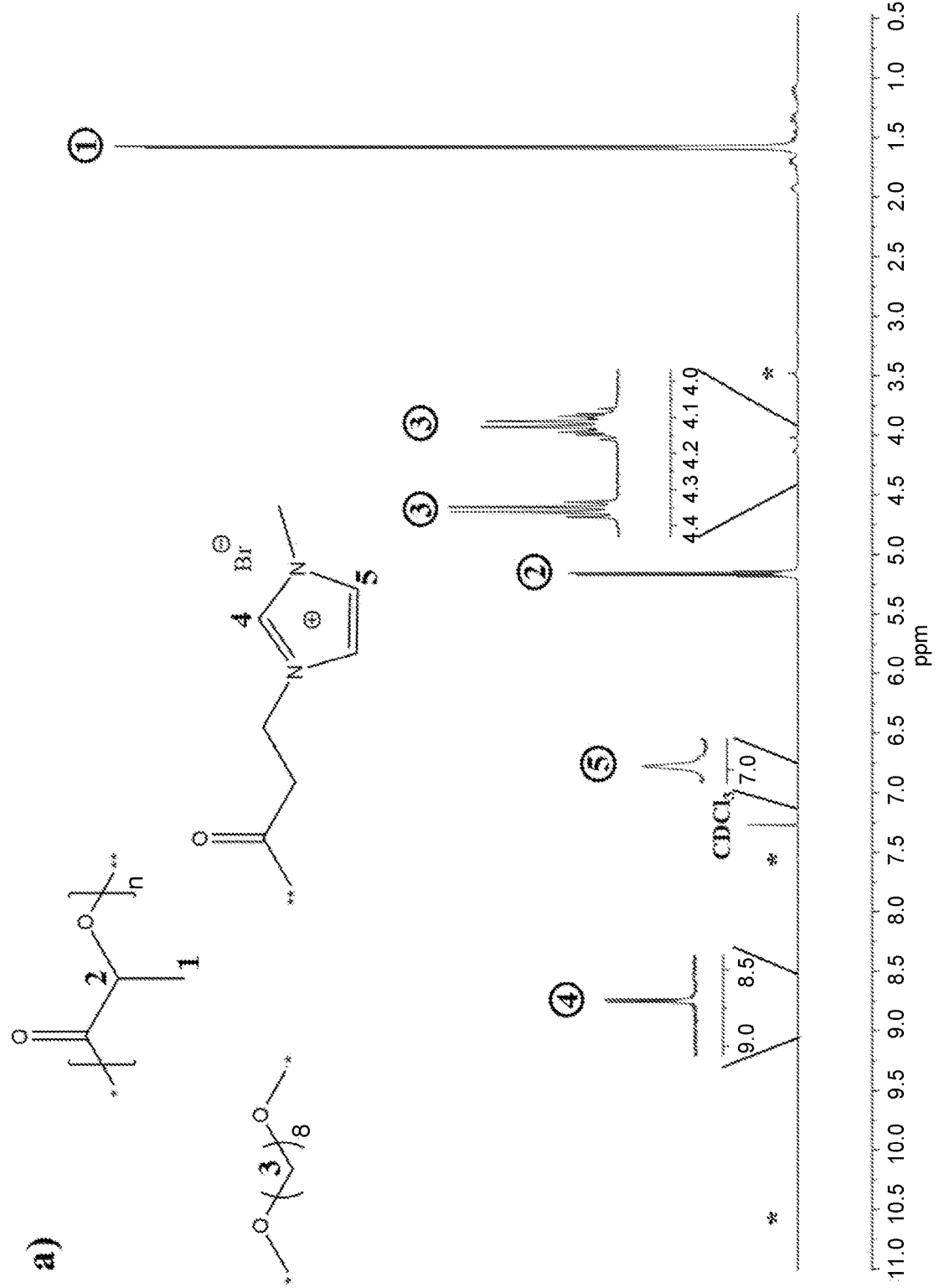
FIG. 17. $^1$H-NMR spectra of im-PLA (a) and im-P[CL-co-LA] (b).
Figure 17:
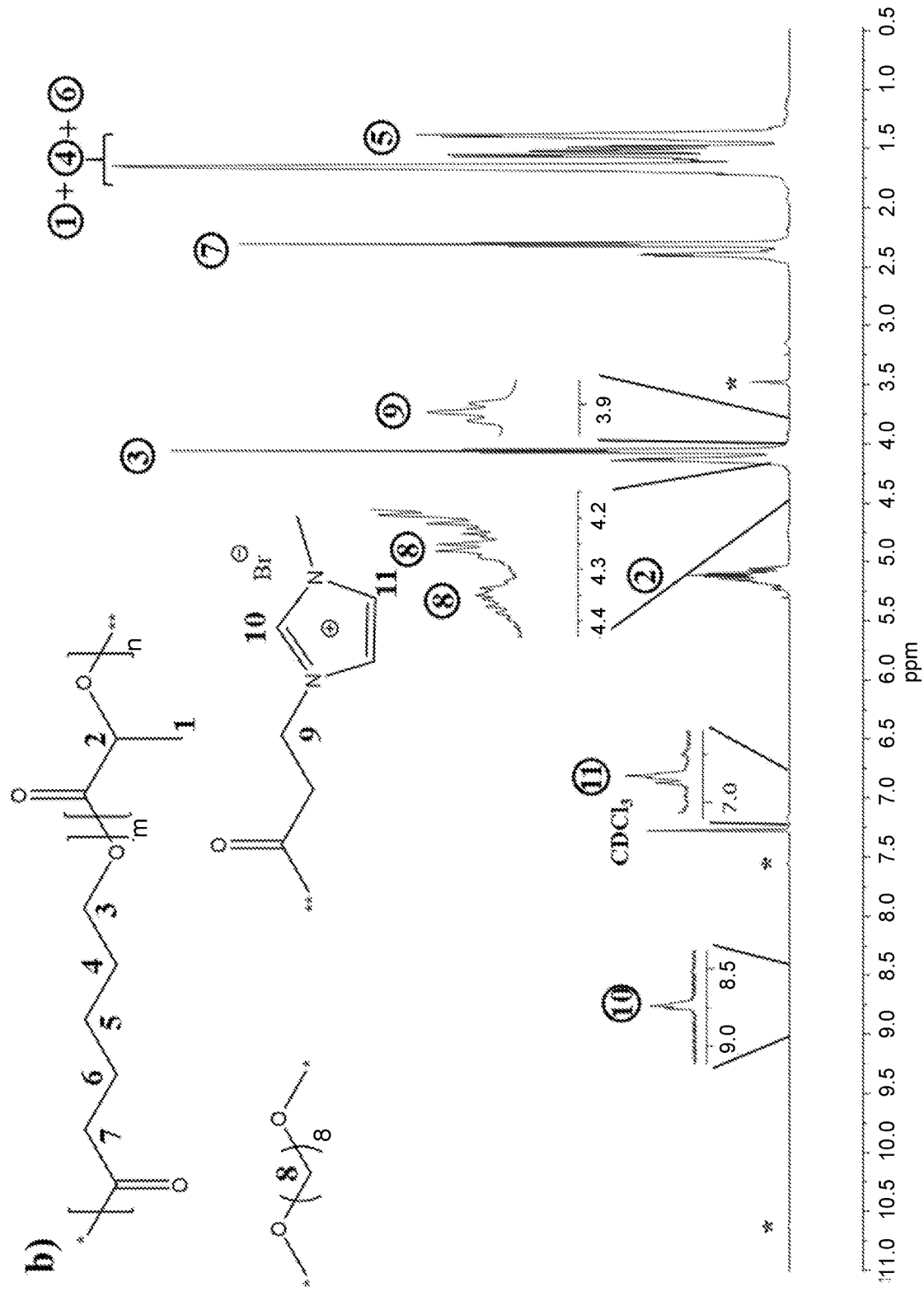

1 eq. of either rigid PLA or soft P[CL-co-LA] synthesized as described above was dissolved in $CH_2Cl_2$ in a glass reactor, followed by addition of 10 eq. of 1-methyl-3-propionic acid-imidazolium bromide, 10 eq. of N,N'-dicyclohexylcarbodiimide and 1 eq. of 4-(dimethylamino)pyridine under stirring at room temperature for 24 h. The end-functionalized polymer was filtered and washed by $CH_2Cl_2$ in order to remove the dicyclohexylurea by-product, and finally recovered by precipitation into a 10-fold excess of methanol, followed by filtration and drying under vacuum (im-PLA: yield≈99%; im-P[CL-co-LA]: yield≈90%. The $^1$H NMR spectra ($CDCl_3$, δ, ppm) at 8.15 (1H, s, —N—CH—N—) and 6.8 ppm (1H, s, —N—CHCH—N—) confirmed the incorporation of imidazolium moieties into the polymers (see FIG. 17).

Sulfonatefunctionalization of Silica Nanoparticles.

Sulfonate-modified silica nanoparticles were prepared following a previously reported method. In a flask, Ludox HS 30 colloidal silica (3 g) was diluted with deionized water (22 ml). In a separate flask, 3-(trihydroxysilyl)-1-propane sulfonic acid (4 g) was also diluted with deionized water (20 ml). The colloidal silica suspension was slowly added to the SIT suspension, while stirring vigorously. To the mixture, a solution of sodium hydroxide solution (1 M) was added dropwise until a pH of about 5 was reached. The entire solution was then heated to 70° C. and stirred vigorously for 24 h. After that, the suspension was cooled to room temperature, placed into dialysis tubing and dialyzed against deionized water for 3 days while changing the water twice a day (d≈17±5 nm, $M_{SO_3H}$≈1 mmol, $R_{organic}$≈24%, C≈10 wt % in water).

Preparation of Ionic Polylactide Hybrids.

Imidazolium-terminated polymers (i.e. im-PLA and/or im-P[CL-co-LA]-IMID) and PLA pellets were dissolved in a minimal amount of DMF under stirring at 70° C. for 1 h. Separately, the 10 wt % solution of sulfonated silica nanoparticles was diluted with DMF and the resulting sulfonated silica was added to the polymer solution. After stirring at 70° C. for an extra 3 h, the resulting solution was solvent-cast at 80° C. and then compression-molded at 180° C. for 5 min.

Characterization Techniques.

Proton nuclear magnetic resonance ($^1$H NMR) spectra were recorded in $CDCl_3$ using a Bruker AMX-500 spectrometer at a frequency of 500 MHz. Size-exclusion chromatography (SEC) was performed in THF (containing 2 wt % $NEt_3$) at 35° C. using an Agilent liquid chromatograph equipped with a degasser, an isocratic HPLC pump (flow rate: 1 mL/min), autosampler (loop volume: 100 μL, solution concentration: 1 mg/mL), refractive index detector, and three columns: a guard column PLgel 10 m and two columns PLgel mixed-B 5 im. Molecular weight and molecular weight distribution were calculated by reference to a relative calibration curve made of polystyrene standards. Differential scanning calorimetry (DSC) was performed using a DSC Q2000 (TA Instruments) at heating and cooling rates of 10° C./min under nitrogen flow (to avoid any thermal history effects the $2^{nd}$ scan was used). Thermal gravimetric analysis (TGA) was performed using a TGA Q500 from TA Instruments at a heating rate of 20° C./min under flowing nitrogen. Dynamic Light Scattering (DLS) was carried out in water (concentration less than 1 wt %) at 25° C. using a Malvern Zetasizer. Rheological measurements were carried out on an Anton-Paar rheometer using frequency sweeps and parallel plate geometry with a diameter of 25 mm. All measurements were performed at 180° C. with a strain of 1% to ensure that the deformations are in the linear viscoelastic regime. Transmission electron microscopy (TEM) was performed on a FEI Tecnai T12 Spirit Twin TEM/STEM microscope operated at 120 kV. The samples were cryomicrotomed at −100° C. by a Leica UCT microtome. Dielectric relaxation measurements were performed on a Broadband Dielectric Spectrometer from $10^{-1}$ to $10^6$ Hz using an ALPHA analyzer supplied by Novocontrol. Samples were placed between two gold-plated electrodes (diameter 20 mm). Conductivity was measured at ambient temperature. The dc conductivity, $\sigma_{dc}$, of the samples was determined from the real part of the complex conductivity in the region of the low-frequency plateau, (~$10^{-1}$ Hz). Dielectric permittivity spectra were further collected isothermally from −70° C. to 100° C. The derivative formalism was applied to the real part of permittivity ε' as a function of the angular frequency co for eliminating the contribution of dc conductivity as successfully exploited by Choi et al. on poly(ethylene) ionomers containing imidazolium pendant groups (see Equation 1).

$$\varepsilon_{der} = -\frac{\pi}{2} \times \frac{\partial \varepsilon'(\omega)}{\partial \ln \omega} \quad (1)$$

Dynamic mechanical analysis was carried out at 55° C. in film shearing mode (specimens of 14×2×0.45 mm³) using Acoem, Metravib, DMA 1150. Frequency sweeps from 100 Hz to 0.01 Hz were performed at a constant strain of 5 µm.

Shape-Memory Characterization.

Samples for shape-memory testing were cut from compression-molded thin films into rectangular specimens of approximately 30×5×0.15 mm³. Dynamic mechanical thermal analyses (DMTA) at ambient atmosphere used a stress-controlled DMTA Q800 apparatus from TA Instruments in a film tension mode. The shape-memory behavior was characterized using a four-step program as follows: 1) deformation: the sample was elongated by applying a given load (stress ramp of 0.1 MPa until ca. 0.5 MPa, and strain around 100%) at a temperature higher than the glass transition temperature ($T_g$) of the neat PLA (T=65° C.); 2) fixing: the sample was cooled at a rate of 2° C./min to room temperature (25° C.) under a constant load; 3) unloading: the load was removed within 2 min (at intervals of 0.1 MPa until 0 MPa); and 4) recovery: the sample was heated to 65° C. at a rate of 2° C./min. The shape-memory behavior was characterized by the shape fixity $R_f$ (see Equation 2) and the shape recovery $R_r$ (see Equation 3) ratios calculated using the following equations:

$$R_f = \frac{\varepsilon_{un}}{\varepsilon_{ext}} \quad (2)$$

$$R_r = \frac{\varepsilon_{un} - \varepsilon_f}{\varepsilon_{ext}} \quad (3)$$

Where $\varepsilon_{ext}$ is the maximum strain before the stress was released, $\varepsilon_{un}$ is the strain after cooling and unloading, and $\varepsilon_f$ is the remaining strain after heating during the recovery step. A good reproducibility was ensured by repeating the actuation program three times.

Figure 9:
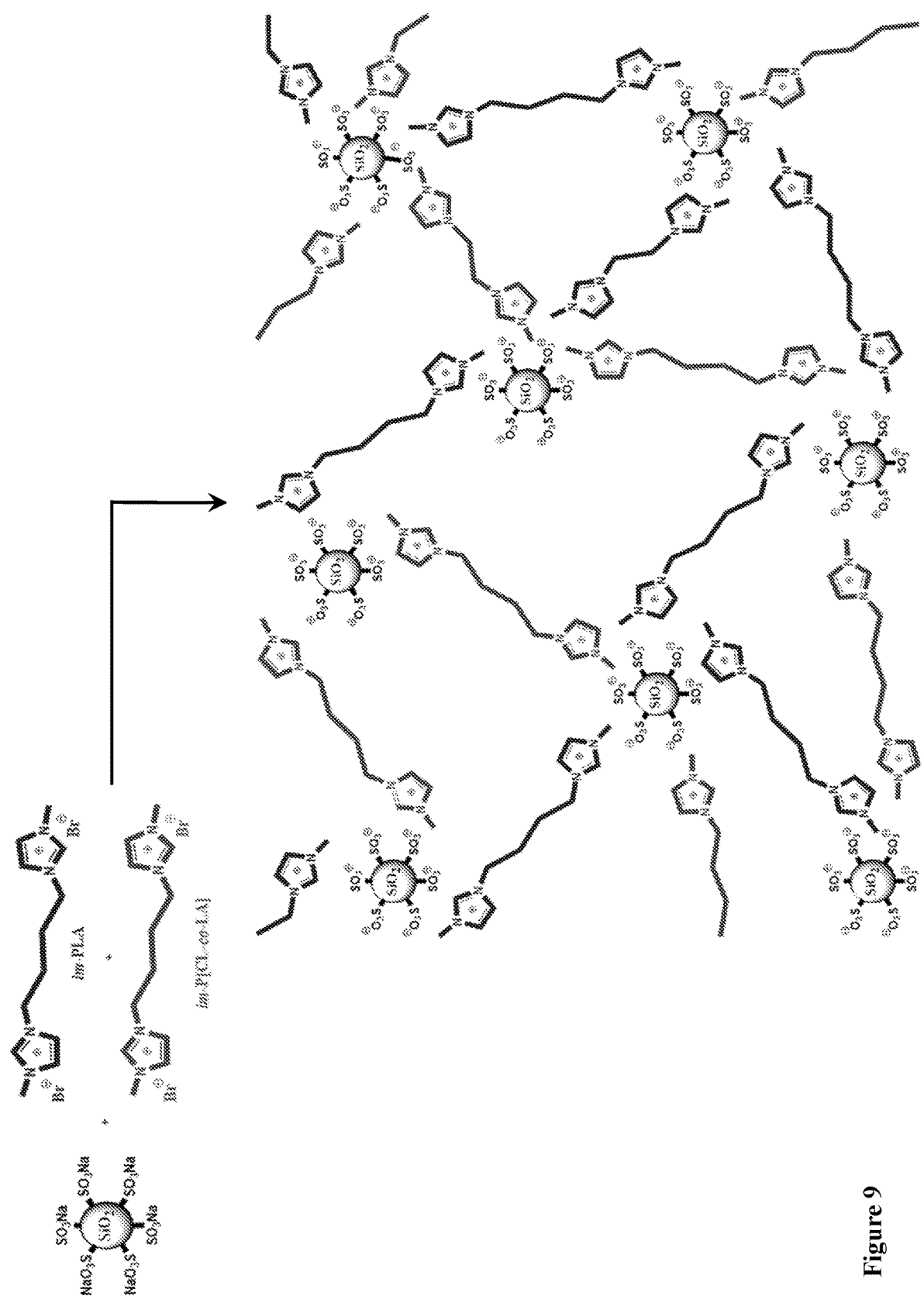
FIG. 9. Schematic of ionic hybrids based on PLA and imidazolium-terminated PLA and P[CL-co-LA] oligomers with sulfonated silica nanoparticles.
Figure 10:
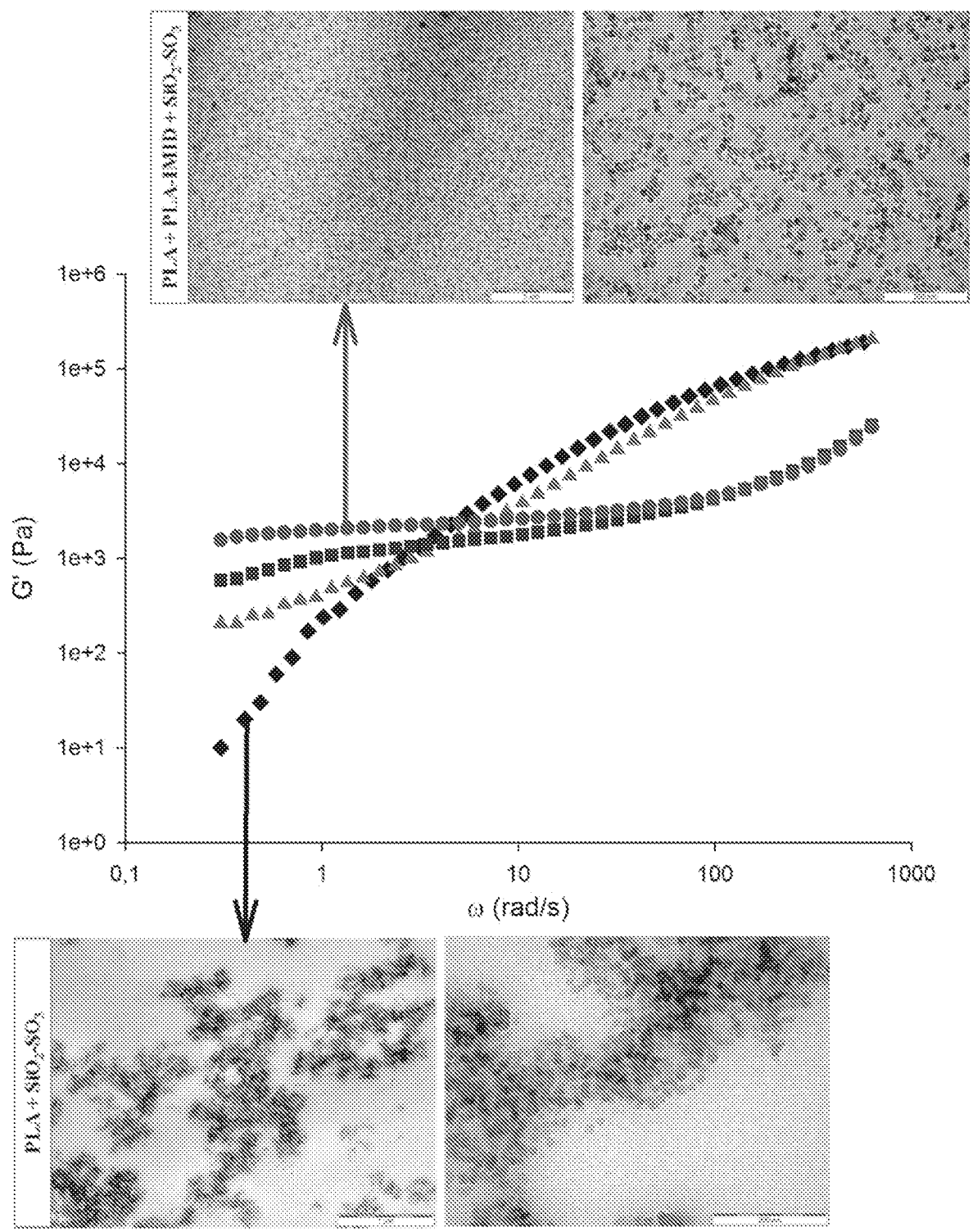
FIG. 10. Storage modulus G' as a function of angular frequency at 180° C. of PLA-based hybrids with 5 wt % of $SiO_2$—$SO_3Na$ (diamonds) and the corresponding hybrids containing 10 wt % (triangles), 30 wt % (squares), and 50 wt % (circles) of im-PLA. Cross-sectional TEM micrographs (with scales of 1 μm (left) and 200 nm (right)) for the hybrids based on neat PLA (bottom) and 50 wt % of im-PLA (top) are also included.
Figure 18:
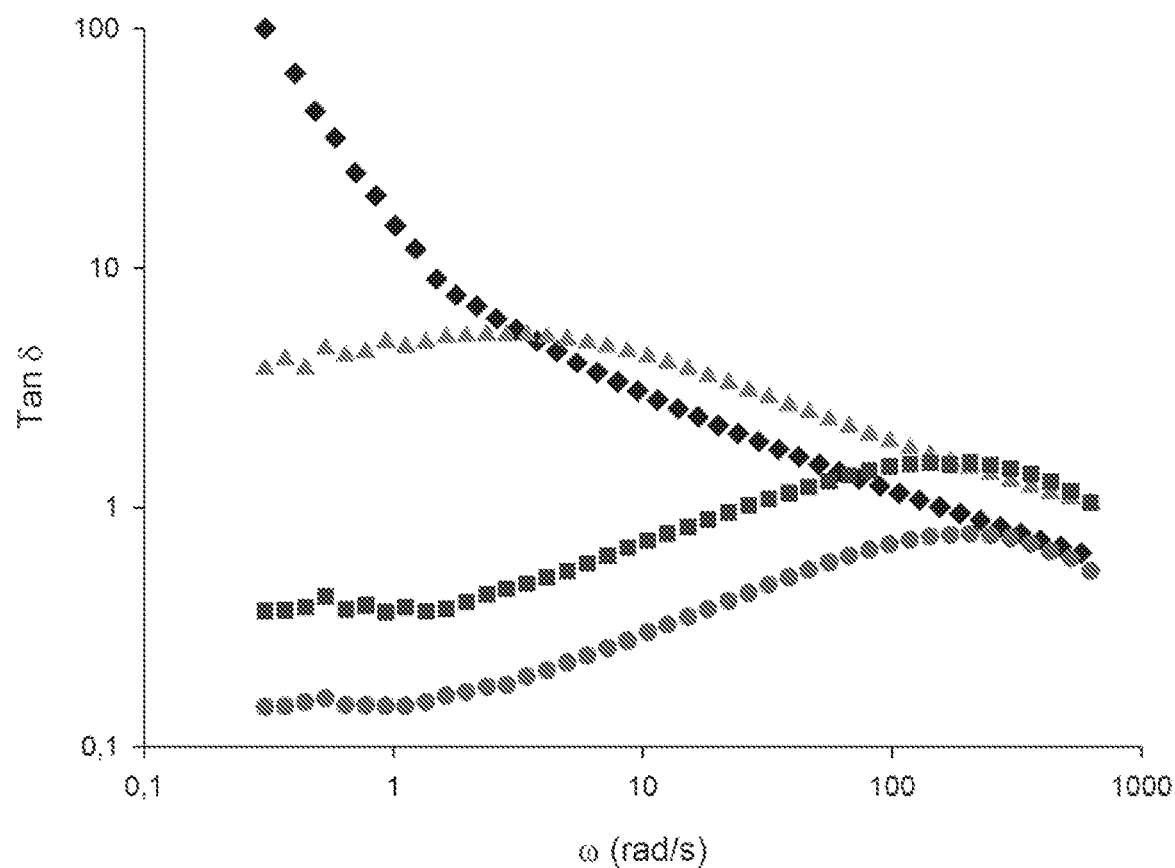
FIG. 18. Loss factor as a function of the angular frequency at 180° C. of PLA-based hybrids containing 5 wt % of nanosilica-$SO_3Na$ (diamonds) and corresponding blends containing 10 wt % (triangles), 30 wt % (squares) and 50 wt. % (circles) of im-PLA.

Results and Discussion. The design of polylactide (PLA)-based materials with shape-memory properties relies on the electrostatic (ionic) interactions between imidazolium-ended polymer segments of rigid polylactide (im-PLA) and soft poly[ε-caprolactone-co-D,L-lactide] (im-P[CL-co-LA]), respectively, with sulfonate-modified silica nanoparticles (nanosilica-SO$_3$Na) (FIG. 9) and the close location of the anionic sulfonate to the cationic imidazolium groups optimizing Coulomb interactions. The system was tuned by the introduction of both rigid im-PLA and soft im-P[CL-co-LA] within the (conventional) PLA matrix. Rheological measurements were used to confirm the importance of electrostatic interactions between the charged ionic groups in the hybrids. The storage modulus of PLA-based hybrids containing 5 wt % of SiO$_2$—SO$_3$Na is affected significantly by the addition of im-PLA (FIG. 10). As the im-PLA content increases, the storage modulus in the lower frequency regime increases by orders of magnitude and a gel-like plateau can be seen. This well-known gel-like behavior (absent from the hybrids of neat PLA containing the same loading of silica nanoparticles) is attributed to the development of the ionic network of the imidazolium-terminated PLA with the charged silica. Using the Winter-Chambon criterion of tan δ being frequency independent (see FIG. 18), it was concluded that the ionic network is formed even at 10 wt % of im-PLA in the PLA matrix.

Importantly, the electrostatic interactions assist with the silica nanoparticle dispersion in the polymer. As the amount of end-functionalized im-PLA in the hybrids increases from 0 to 50 wt %, the nanoparticle dispersion improves (FIG. 10 and FIG. 11a). Note that nanoparticle dispersion in polymers is a perennial challenge has prevented nanocomposites from reaching their full potential in terms of performance. It was posited that the new design can be exploited in other systems to readily synthesize well-dispersed nanocomposites with enhanced properties.

Figure 11:
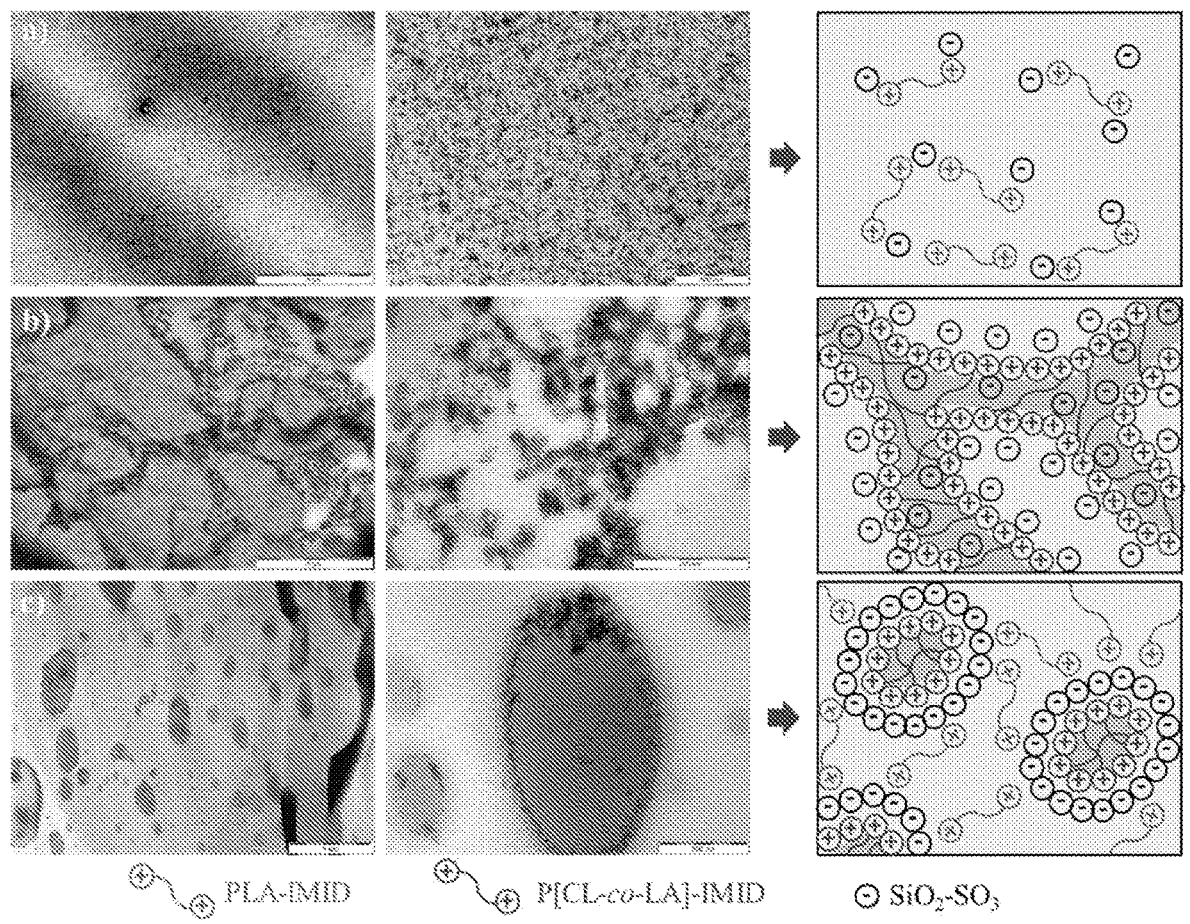
FIG. 11. Cross sectional TEM micrographs (with scales of 5 μm (left) and 500 nm (center) for PLA/$SiO_2$—$SO_3Na$ (5 wt %) hybrids containing a) 50 wt % of im-PLA, b) 50 wt % of im-P[CL-co-LA], and c) 25 wt % of im-PLA and 25 wt % of im-P[CL-co-LA]. The schematics on the right are ideal representations of the observed microstructure for each sample.

The ionic interactions and formation of the ionic network can be used to explain the overall morphology of the hybrids (FIG. 11). Note that im-PLA appears miscible with PLA leading to a uniform morphology of the polymer matrix. The only features seen in the TEM images are those of the silica nanoparticles (FIG. 11a). In contrast, addition of im-P[CL-co-LA] forms a second phase (FIG. 11b,c). When im-P[CL-co-LA] is added alone a double network is seen while the addition of both im-PLA and im-P[CL-co-LA] in PLA leads to dispersed spherical inclusions (FIG. 11c). The morphologies of all samples are consistent with optimizing the location of silica particles to maximize electrostatic interactions between the sulfonate and imidazolium groups. Furthermore, the location of nanoparticles at the interface of both im-PLA and im-P[CL-co-LA] stabilizes the final phase-morphology and minimizes their incompatibility with the PLA matrix.

Figure 12:
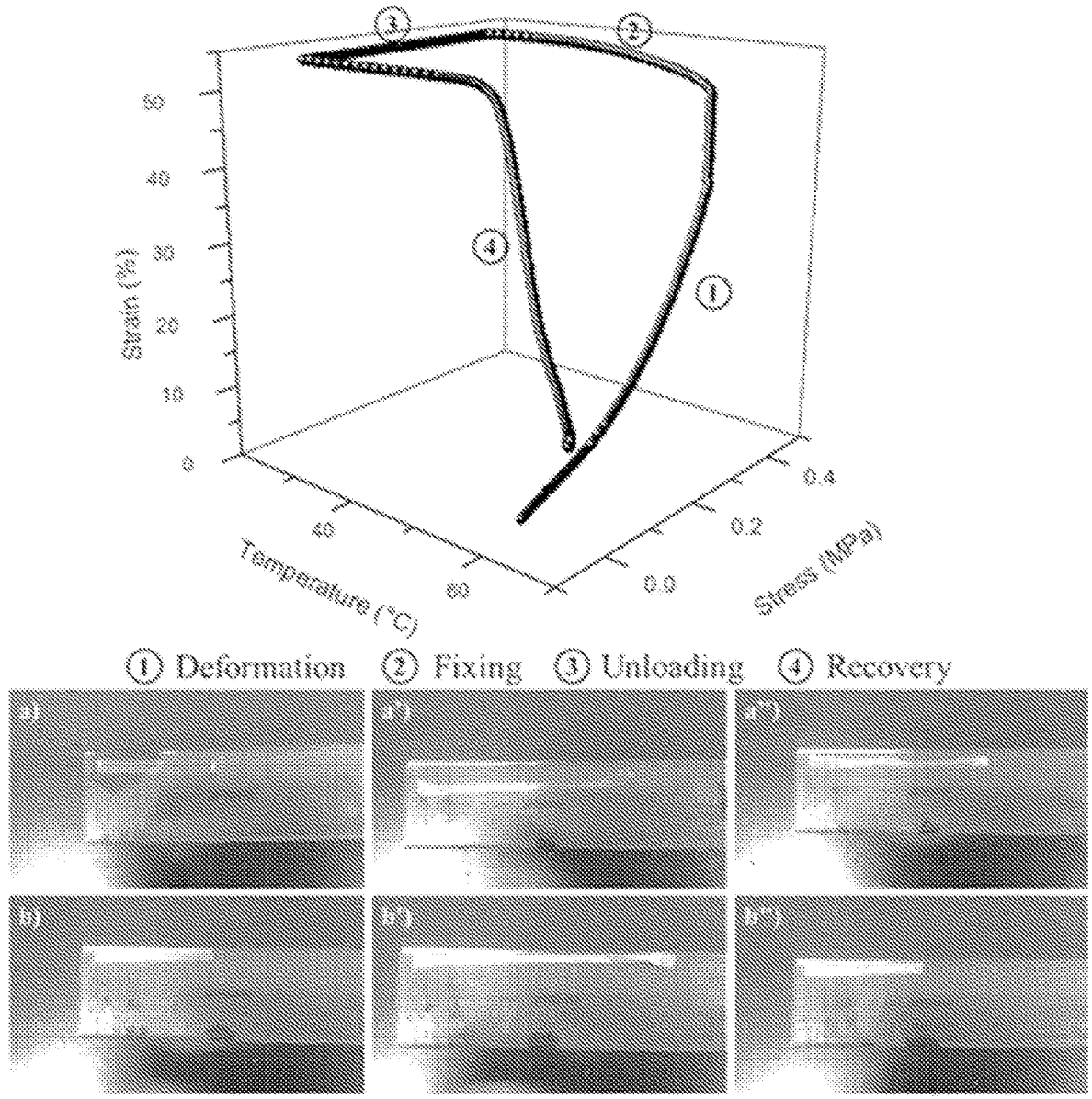
FIG. 12. Shape-memory properties of neat PLA (images a, a' and a") and PLA-based hybrids containing 25 wt % of im-PLA and 25 wt % of im-P[CL-co-LA] with 5 wt % of $SiO_2$—$SO_3Na$ (images b, b' and b"). The initial length for each sample is 4 cm (images a and b). The samples are stretched at 65° C. to 8 cm, (100% of deformation) and fixed at this size by cooling to 25° C. (images a' and b'). Then, the samples are reheated to 65° C. and their recovery is measured (images a" and b").
Figure 19:
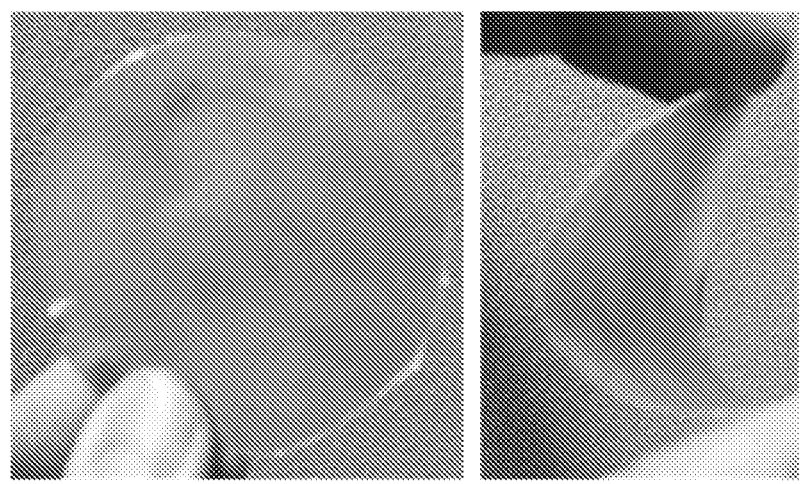
FIG. 19. Pictures demonstrating the deformable nature of PLA films based on the ionic hybrids. Note that the neat PLA as well as hybrids void of any ionic interactions are fairly brittle.

The introduction of the dynamic ionic interactions converts the brittle PLA matrix into a tough polymer able to withstand very high levels of deformation (see FIG. 19). Owing to an interest in developing shape-memory polymers the next focus was on characterizing the shape-memory effect (FIG. 12). For testing, the samples were heated to 65° C. (T>$T_g$ of the PLA matrix) and stretched to a given elongation ($\varepsilon_{ext}$≈100%) by applying a constant deformation stress ($\sigma_{app}$=0.1 MPa). Subsequently, the samples were cooled to room temperature (i.e. 25° C.) under constant stress. The shape fixity ratio, $R_f$, describes the ability of the material to maintain the deformation after cooling and release of the load while the shape recovery ratio, $R_r$, refers to the ability of the material to revert to (memorize) its original state after heating.

Figure 13:
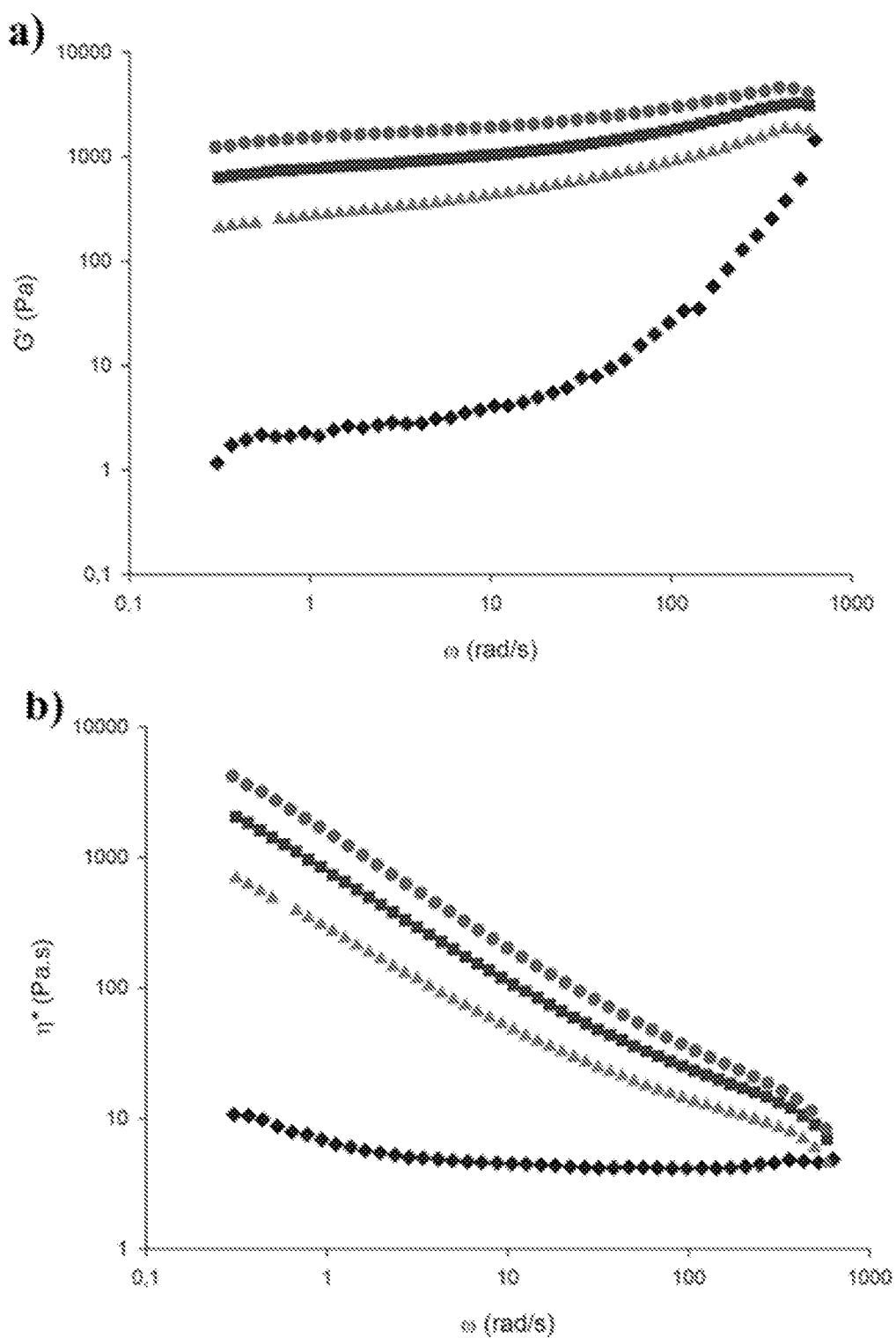
FIG. 13. Storage modulus G' (a) and complex viscosity $\eta^*$ (b) as a function of the angular frequency at 180° C. for PLA/im-PLA/im-P[CL-co-LA] (50/25/25 wt %) (diamonds) and corresponding hybrids containing 1 wt % (triangles), 3 wt % (squares) and 5 wt % (circles) of $SiO_2$—$SO_3Na$.

Neat PLA displayed poor shape-memory properties, even, when a low stress is applied (FIG. 12a). Addition of 5 wt % ionic silica nanoparticles ($SiO_2$—$SO_3Na$) to PLA leads to brittle materials with an even worse shape-memory behavior ($R_r$ decreases from 10 to 2%, respectively). In contrast, virtually all PLA-ionic hybrids show an improved shape memory effect. The best improvement ($R_r$~80%) is for the ionic hybrid consisting of 25 wt % im-PLA and 25 wt % im-P[CL-co-LA] (FIG. 12b). Table 4 summarizes the shape-memory performance of PLA-based systems quantified by DMTA. Note that adding the imidazolium-terminated polymers to PLA but in the absence of silica nanoparticles (i.e. hybrids void of the ionic network) leads to a minor improvement ($R_r$=20%). In contrast, the addition of the charged silica nanoparticles to form ionic hybrids improves dramatically $R_r$ and the improvements scale with the amount of silica added. The $R_r$ values for the hybrids containing 1, 3, and 5 wt % silica are 55, 65 and 79%, respectively. Note that the theoretical charge balance (i.e. 1:1 ratio sulfonate:imidazolium ratio) at this specific composition (i.e. 25 wt % im-PLA and 25 wt % im-P[CL-co-LA]) is achieved at about 5 wt % of silica. Note also that the ionic hybrid with the best shape-memory behavior is based on both im-PLA and im-P[CL-co-LA] surrounded by silica within the PLA phase (see FIG. 11c). The shape-memory effect is significantly dependent on the silica content and the material composition. For instance, changing the ratio of im-PLA/im-P[CL-co-LA] from 1:1 led to significant decreases of shape-memory properties. The formation of the ionic network and unique morphologies seem to play a significant role in determining the shape memory behavior. In this respect, the rheological measurements discussed earlier are consistent with the formation of such unique ionic structures resulting in significant increases in the storage modulus and related complex viscosity in the low frequency regime (FIG. 13).

TABLE 4

Shape-memory properties of neat PLA and corresponding PLA-based hybrids of im-PLA and im-P[CL-co-LA] with $SiO_2$—$SO_3Na$.

| Entry | PLA (wt %) | im-PLA (wt %) | im-P[CL-co-LA] (wt %) | nanosilica-$SO_3Na$ (wt %) | $R_f$ (%) | $R_r$ (%) |
|---|---|---|---|---|---|---|
| 1 | 100 | 0 | 0 | 0 | ≈100 | 10 |
| 2 | 100 | 0 | 0 | 5 | ≈100 | 2 |
| 3 | 75 | 25 | 0 | 5 | ≈100 | 5 |
| 4 | 50 | 50 | 0 | 5 | ≈100 | 26 |
| 5 | 75 | 0 | 25 | 5 | ≈100 | 21 |
| 6 | 50 | 0 | 50 | 5 | ≈100 | 48 |
| 7 | 50 | 25 | 25 | 0 | ≈100 | 17 |
| 8 | 50 | 25 | 25 | 1 | ≈100 | 55 |
| 9 | 50 | 25 | 25 | 3 | ≈100 | 65 |
| 10 | 50 | 25 | 25 | 5 | ≈100 | 79 |
| 11 | 50 | 20 | 30 | 5 | ≈100 | 12 |
| 12 | 50 | 30 | 20 | 5 | ≈100 | 23 |
| 13 | 90 | 5 | 5 | 5 | ≈100 | 59 |
| 14 | 70 | 15 | 15 | 5 | ≈100 | 73 |

As determined by DMTA tests in tension film mode (First equilibrate at 65° C., ramp stress 0.1 MPa/min to 0.5 MPa, i.e. strain around 80%, equilibrate at 25° C., ramp stress 0.1 MPa/min to 0 MPa, ramp temperature 2° C./min to 65° C.).

Figure 14:
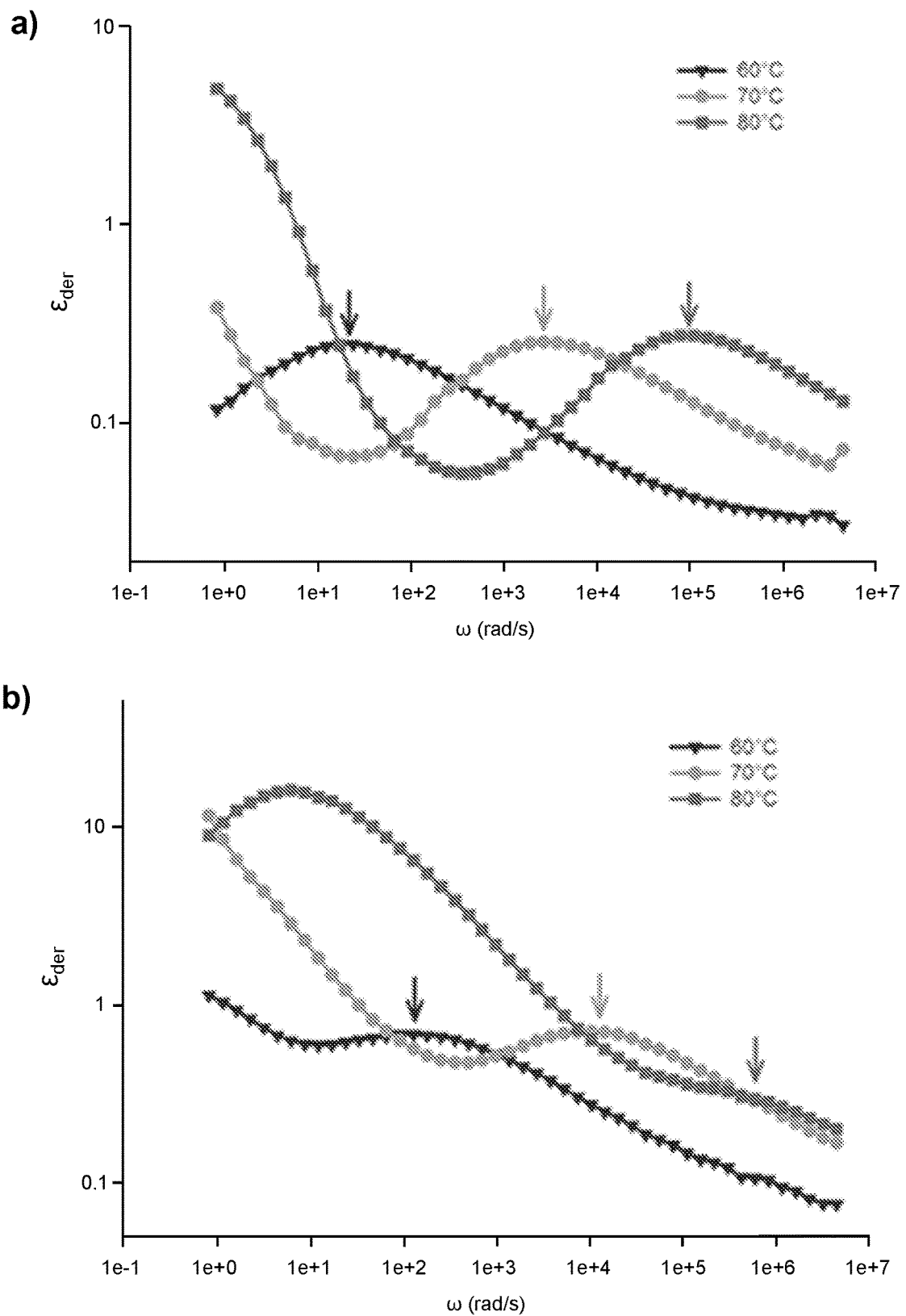
FIG. 14. Dielectric spectra of neat PLA and PLA based hybrids at different temperatures: 60° C. (triangles), 70° C. (circles) and 80° C. (squares) for a) neat PLA; b) PLA/im-PLA (50/50 wt %); c) PLA/im-PLA/$SiO_2$—$SO_3Na$ (50/50/5 wt %); (d) and PLA/im-PLA/im-P[CL-co-LA] (50/25/25 wt %); and (e) PLA/im-PLA/im-P[CL-co-LA]/$SiO_2$—$SO_3Na$ (50/25/25/5 wt %). The asterisks and arrows indicate the second low-frequency relaxation and the $\omega_{max}$, respectively.
Figure 14:
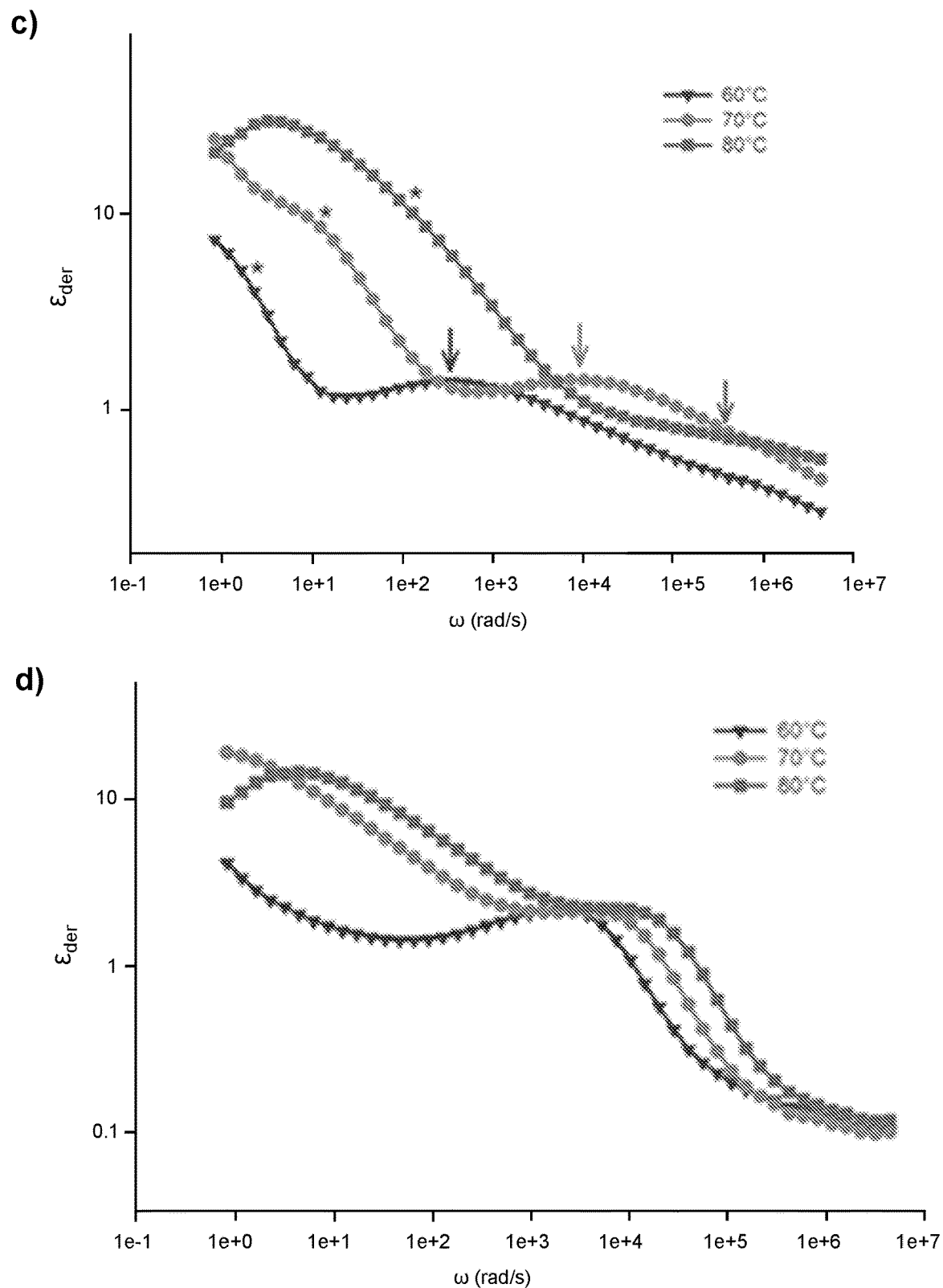
Figure 14:
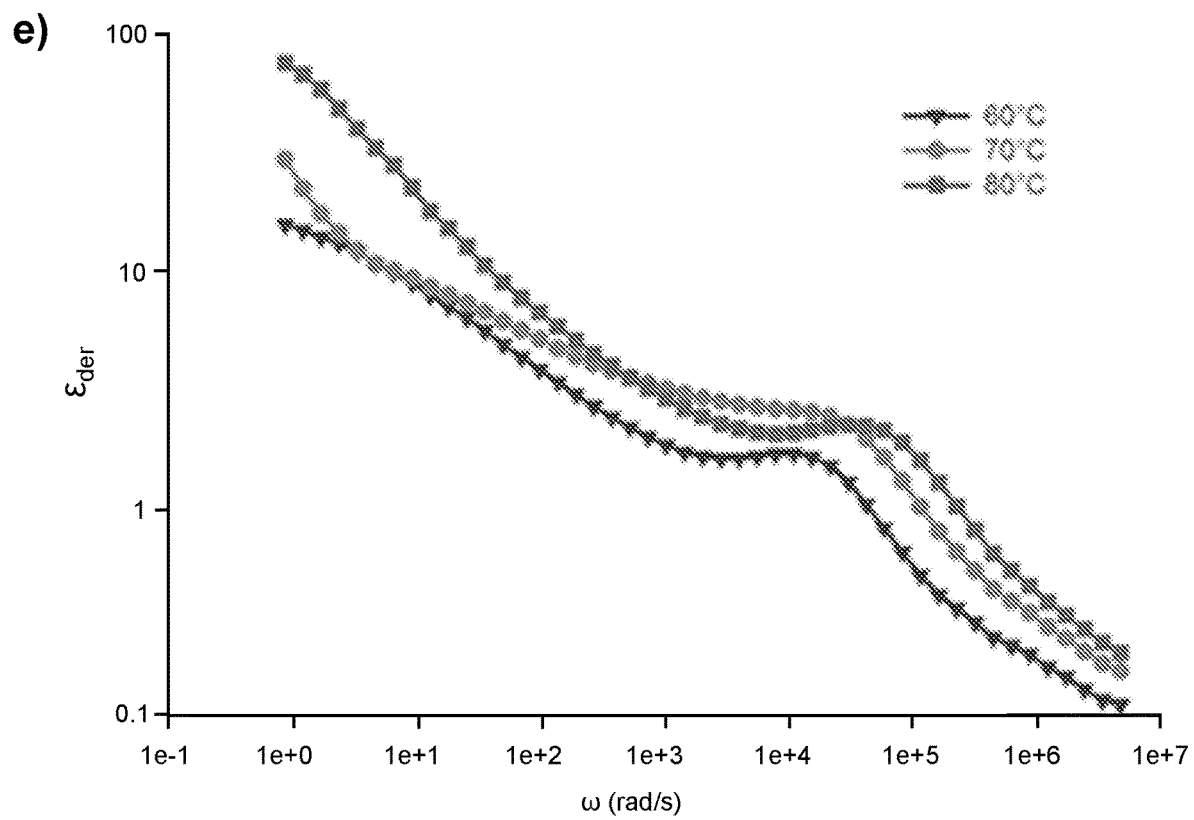
Figure 20:
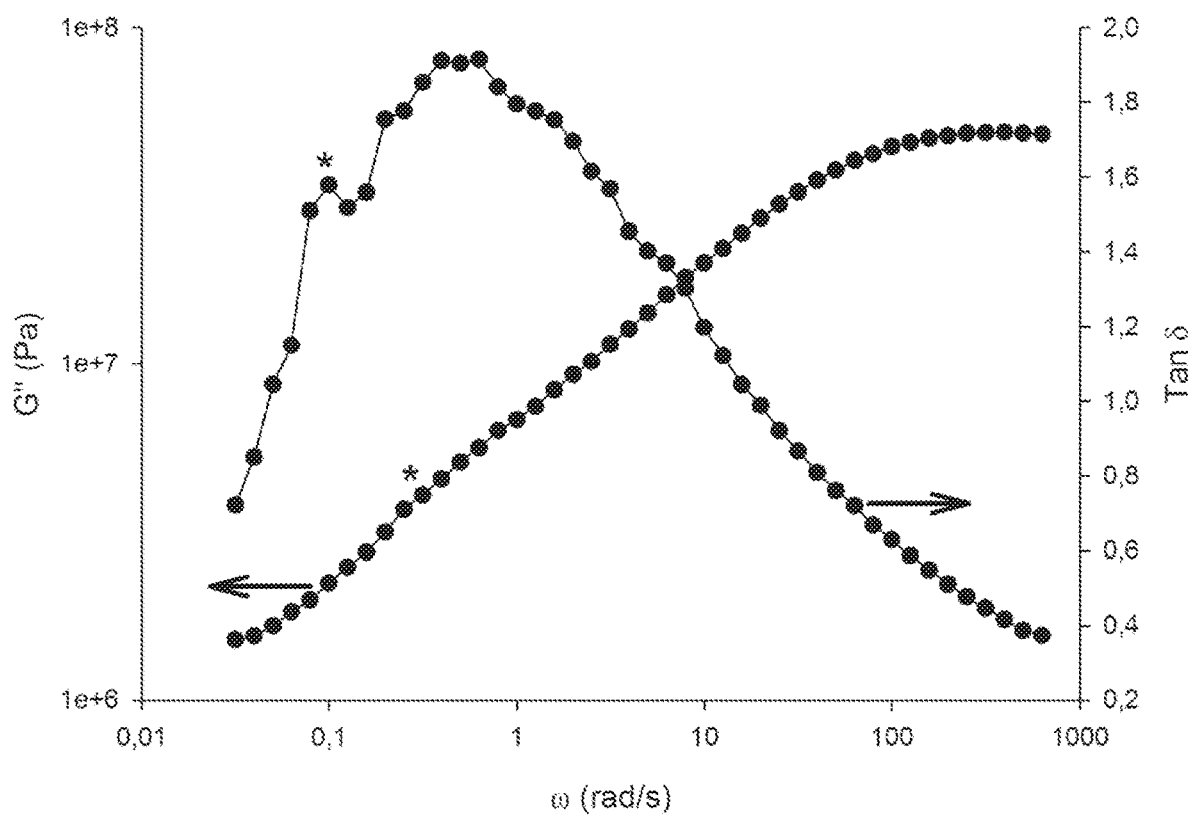
FIG. 20. Dynamic mechanical analysis at 55° C. of PLA hybrids containing 50 wt % of im-PLA and 5 wt % of $SiO_2$—$SO_3Na$. The asterisks indicate the second relaxation that is consistent with the presence of "immobilized" im-PLA on the surface of silica nanoparticles.

The shape memory properties are clearly governed by a complex synergy between the different components in the hybrids with the recovery performance linked to the polymer chain mobility near the glass transition. To probe this effect and in an effort to understand the structure-shape recovery relationship, the hybrids were characterized further by dielectric and mechanical spectroscopy. First, the α-relaxation process was investigated by dielectric spectroscopy (FIG. 14). For neat PLA, the segmental α-relaxation could be readily observed between 60-80° C. with the $\omega_{max}$ between $3.10^1$-$1.10^5$ rad·$s^1$ (FIG. 14a) in good agreement with previously reported values by Mierzwa et al. The incorporation of 50 wt % of im-PLA in PLA shifts the segmental α-relaxation to higher frequencies by ca. 1 decade, which is probably due to the plasticization of the PLA matrix by the low-molecular weight im-PLA (FIG. 14b). While the addition of silica nanoparticles to produce the ionic hybrids has a small effect on the segmental α-relaxation process, it also leads to a second relaxation at low frequencies (marked by an asterisk in the spectra) with a shift by ca. 2-3 decades depending on temperature (FIG. 14c). It is believed that this second, low-frequency relaxation with moderate amplitude is due to the "immobilized" im-PLA interacting strongly with the silica nanoparticles via electrostatic interactions as discussed previously. The shift of the α-relaxation of PLA to higher frequencies upon addition of im-PLA probably due to the plasticization of the PLA matrix by the low-molecular weight im-PLA is consistent with dynamic mechanical analysis (see FIG. 20). Note that the DMA was performed at a different temperature compared to the dielectric relaxation spectroscopy measurements.

A consistent albeit more complicated picture was observed for the neat im-PLA/im-P[CL-co-LA] and the corresponding hybrids. The spectra are dominated by a high-frequency relaxation in the range $10^3$-$10^4$ Hz, which is specifically attributed to the terminal relaxation (i.e. rubbery-liquid transition) and/or normal relaxation modes of im-P[CL-co-LA]while the α-relaxation of PLA seems to be depressed. Upon addition of the silica nanoparticles, the main relaxation becomes slower by approximately an order of magnitude and a second (weaker) relaxation at lower frequencies (as in the case of im-PLA) can be seen. As discussed above, this second relaxation is attributed to "immobilized" im-PLA interacting strongly with the silica nanoparticles via electrostatic interactions. The intensity is lower though consistent with the lower amount of im-PLA in the sample.

While the specific mechanism responsible for shape memory in the instant systems is unclear at present, it is considered that it is largely due to the presence of ionic interactions between the cationically-charged imidazolium chains and the negatively-charged silica nanoparticles. Note that the neat PLA or the silica hybrid based on PLA only show poor shape memory behavior with $R_r$ of 10% and 2%, respectively (Entries 1 & 2, Table 4). Ionic hybrids based on blends of 50 wt % im-PLA or 50 wt % im-P[CL-co-LA] in PLA (Entries 4 & 6, Table 4) exhibit better $R_r$ than the neat polymer or hybrids void of ionic interactions. In addition, shape memory behavior improves as the amount of silica nanoparticles (and the extent of ionic interactions) increases in the hybrids (Entries 7 to 10, Table 4). The best performances are seen for samples containing equimolar amounts of both im-PLA and im-P[CL-co-LA] (Entries 10, 13 & 14, Table 4). In addition to the ionic interactions, the microstructure and morphology of the sample appear to be important. For example, recall the composition based on 25 wt % im-PLA and 25 wt % im-P[CL-co-LA] is made up of dispersed spherical inclusions (FIG. 11c). Based on the above, and consistant to the extensive literature on ionomer based shape-memory polymers, it is considered that the ionic interactions facilitate shape memory by serving as a permanent network (i.e. the anionic silica nanoparticles act as netpoints between the cationic polymer chains).

Figure 15:
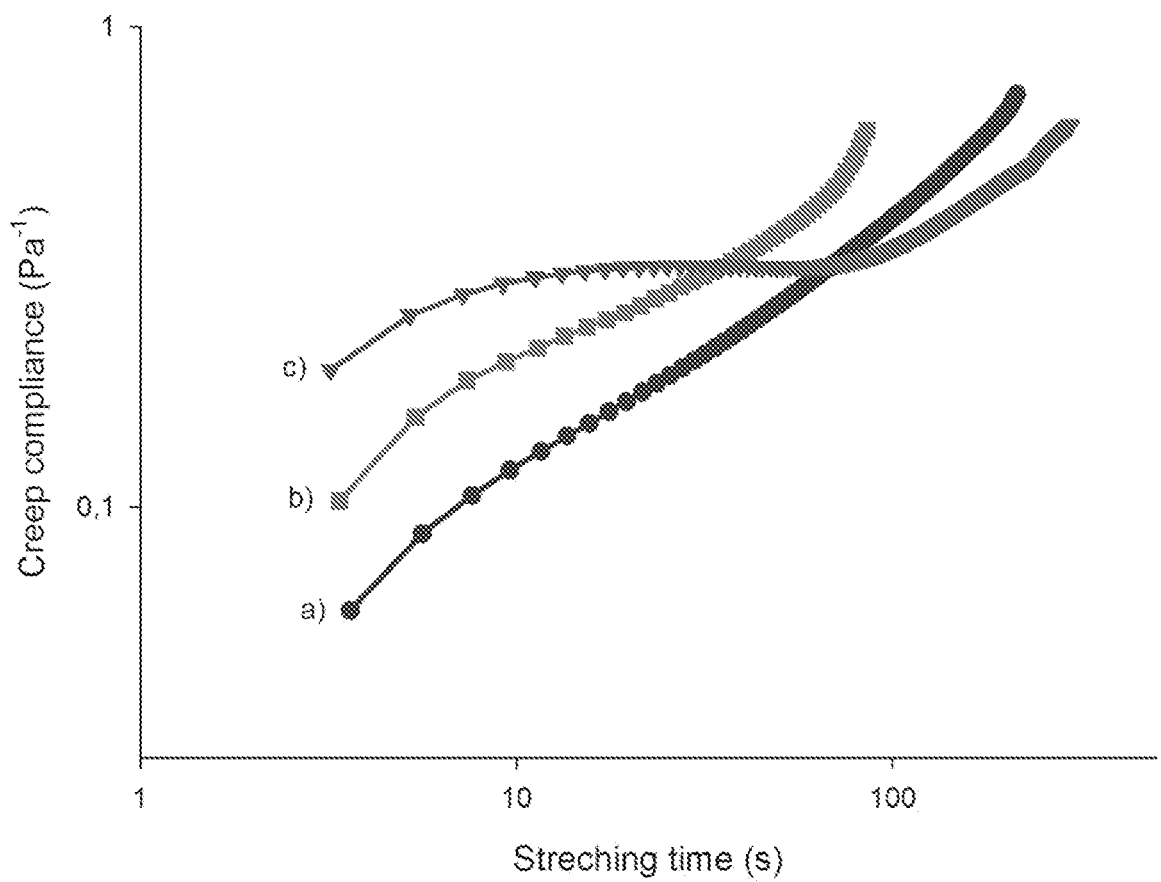
FIG. 15. Creep compliance as a function of stretching time for a) neat PLA (circles), b) PLA/im-PLA/$SiO_2$—$SO_3Na$ (50/50/5 wt %) (squares) and c) PLA/im-PLA/im-P[CL-co-LA]/$SiO_2$—$SO_3Na$ (50/25/25/5 wt %) (triangles).

In an effort to better understand the mechanism, creep experiments were carried out (FIG. 15). The creep compliance increases with stretching time for neat PLA and the PLA/im-PLA/SiO$_2$—SO$_3$Na hybrid (50/50/5 wt %, respectively), showing an inflection point at intermediate stretching times. The first part is basically associated with the glass-rubbery transition, while the final part is related to the rubbery-liquid transition. The rubbery plateau appears very short (almost absent for the neat PLA) for these two systems with a liquid state obtained at short stretching times (<100 s). The final part at high stretching time even reaches a slope of ca. 1 (in log-log plot) indicating full relaxation of the polymer chains. The absence of the rubbery plateau and the liquid-like behavior at long stretching times are consistent with the poor shape memory behavior in these systems. In contrast, the PLA/im-PLA/im-P[CL-co-LA]/SiO$_2$—SO$_3$Na hybrid (50/25/25/5 wt %) shows a dramatically different behavior, especially for intermediate and long stretching times. Indeed, the creep compliance reaches a constant value during stretching and an extremely long rubbery plateau. Moreover, the rubbery-liquid transition is broad and full relaxation (slope of ca. 1) is not fully reached probably due to the presence of the ionic network. Recall that the neat PLA and the PLA/im-PLA/SiO$_2$—SO$_3$Na hybrid show poor shape memory behavior and the PLA/im-PLA/im-P[CL-co-LA]/SiO$_2$—SO$_3$Na hybrid displays the best recovery ratio, $R_r$. As stated above the ionic interactions provide a network, which prevents permanent slippage and triggers shape recovery. Clearly while the presence of the ionic interactions appears to be important the system is complex enough so that a more detailed analysis to relate structure and morphology with properties is underway and will be reported in a forthcoming publication.

The design and synthesis of polylactide (PLA)-based ionic hybrids based on commercial PLA and imidazolium-terminated im-PLA and im-P[CL-co-LA] with surface-modified silica nanoparticles is reported. The new materials design exploits the reversible and dynamic nature of the ionic bonding between the imidazolium-terminated polymers and the sulfonated silica nanoparticles leading to better nanoparticle dispersion with distinct morphologies in the hybrids and unique performance. Rheological measurements show an increase in the storage modulus and a gel-like plateau consistent with the formation of an ionic network, which is absent from the hybrids of neat PLA containing the same amount of silica nanoparticles. The ionic hybrids are also much more deformable compared to the neat PLA. More importantly, they exhibit shape-memory behavior. The best shape memory properties are fixity and recovery ratio of $R_f \approx 100\%$ and $R_r = 79\%$, respectively, for the 25 wt % im-PLA and 25 wt % im-P[CL-co-LA] in the presence of 5 wt % of SiO$_2$—SO$_3$Na. This composition corresponds with the silica to polymer ratio required for charge-balance (i.e. 1:1 ratio sulfonate:imidazolium ratio). Dielectric spectroscopy and dynamic mechanical analysis was used to shed light into the shape memory mechanism by following the segmental α-relaxation process of the PLA matrix. A second, low-frequency relaxation was observed in the hybrids with SiO$_2$ nanoparticles that is attributed to strongly bound polymer chains on silica due to electrostatic interactions. Creep compliance tests suggest that the ionic interactions facilitate shape-memory by serving as a permanent network and by preventing permanent slippage. Indeed, a constant creep compliance, an extremely long rubbery plateau and longer relaxation times are consistent with the significant shape-memory behavior observed for PLA/im-PLA/im-P[CL-co-LA]/SiO$_2$—SO$_3$Na ionic hybrids.

The invention claimed is:

1. An ionic nanocomposite comprising:
a) a plurality of nanomaterials, wherein the nanomaterials are electrically charged; and
b) one or more polymer materials, each polymer material comprising a plurality of organic moieties and/or functional groups bearing the opposite charge of the nanomaterials, wherein the nanomaterials and the polymer material(s) interact through ionic interactions; and wherein at least one of the one or more polymer materials comprises a polymer having the following structure:

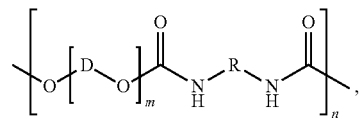

wherein:
D is, at each occurrence in the polymer, either an alkyl moiety comprising 1 to 14 carbons and m is 1 to 50,000;
R is, at each occurrence in the polymer, an aliphatic moiety comprising 1 to 24 carbons, a carbocyclic moiety comprising 6 to 24 carbons, or a heterocyclic moiety comprising 2 to 24 carbons and one or more heteroatom selected from the group consisting of N, O, S, P, and combinations thereof; and
n is 1 to 200,000, and wherein at least one D further comprises one or more pendant positively charged moiety and/or one or more pendant positively charged group.

2. The ionic nanocomposite of claim 1, wherein the nanomaterials have a plurality of negatively charged functional groups disposed on at least a portion of a surface of the nanomaterials and the at least one of the one or more polymer materials comprises a plurality of positively charged organic functional groups.

3. The ionic nanocomposite of claim 2, wherein the negatively charged functional groups are selected from the group consisting of sulfate (SO$_3^-$) groups, carboxylate (—C(O)O$^-$) groups, phosphate (—P(O)$_3$O$^-$) groups, and combinations thereof.

4. The ionic nanocomposite of claim 1, wherein the nanomaterials are nanoparticles (NPs).

5. The ionic nanocomposite of claim 1, wherein the nanomaterials are present at 1 to 40 percent by weight of the nanocomposite.

6. The ionic nanocomposite of claim 1, wherein the nanomaterials are present at 10 to 30 percent by weight of the nanocomposite.

7. The ionic nanocomposite of claim 1, wherein the at least one of the one or more polymer materials comprises a plurality of charged pendant groups.

8. The ionic nanocomposite of claim 7, wherein the charged pendant groups are imidazolium groups, ammonium groups, triazolium groups, phosphonium groups, pyridinium groups, and combinations thereof.

9. The ionic nanocomposite of claim 1, wherein at least one of the one or more polymer materials is a polylactide (PLA), a lactide copolymer, an imidazolium-terminated PLA, or a combination thereof.

10. The ionic nanocomposite of claim 1, wherein the plurality of nanomaterials are sulfonate-modified silica nanoparticles and at least one of the one or more polymer materials is an amorphous (PEG-ran-PPG based) imidazolium-functionalized polyurethane and at least one of the one or more polymer materials is a semi-cristalline (PEG based) imidazolium-functionalized polyurethane.

11. The ionic nanocomposite of claim 1, wherein the nanocomposite comprises two different polymer materials.

12. The ionic nanocomposite of claim 1, wherein the ionic nanocomposite exhibits shape memory behavior.

13. The ionic nanocomposite of claim 1, wherein the ionic nanocomposite exhibits a 5 times or greater increase in strain at break.

14. The ionic nanocomposite of claim 1, wherein D is, at each occurrence in the polymer, an alkyl moiety comprising 3 to 6 carbons.

15. A film comprising one or more ionic nanocomposite of claim 1.

16. The film of claim 15, wherein the ionic nanocomposite is present as a film.

17. The film of claim 16, wherein the film is planar or non-planar.

18. An article of manufacture comprising one or more ionic nanocomposite of claim 1.

19. A device comprising a nanocomposite of claim 1.

20. The device of claim 19, wherein the device is a sensor or an actuator.

21. An ionic nanocomposite comprising:
a) a plurality of nanomaterials, wherein the nanomaterials are electrically charged; and
b) one or more polymer materials, each polymer material comprising a plurality of organic moieties and/or functional groups bearing the opposite charge of the nanomaterials, wherein the nanomaterials and the polymer material(s) interact through ionic interactions; and wherein at least one of the one or more polymer materials is a polylactide (PLA), a lactide copolymer, an imidazolium-terminated PLA, or a combination thereof.

22. The ionic nanocomposite of claim 21, wherein the nanomaterials have a plurality of negatively charged functional groups disposed on at least a portion of a surface of the nanomaterials and the at least one of the one or more polymer materials comprises a plurality of positively charged organic functional groups.

23. The ionic nanocomposite of claim 22, wherein the negatively charged functional groups are selected from the group consisting of sulfate ($SO_3^-$) groups, carboxylate ($-C(O)O^-$) groups, phosphate ($-P(O)_3O^-$) groups, and combinations thereof.

24. The ionic nanocomposite of claim 21, wherein the nanomaterials are nanoparticles (NPs).

25. The ionic nanocomposite of claim 21, wherein the nanomaterials are present at 1 to 40 percent by weight of the nanocomposite.

26. The ionic nanocomposite of claim 21, wherein the at least one of the one or more polymer materials comprises a plurality of charged pendant groups.

27. The ionic nanocomposite of claim 26, wherein the charged pendant groups are imidazolium groups, ammonium groups, triazolium groups, phosphonium groups, pyridinium groups, and combinations thereof.

28. The ionic nanocomposite of claim 21, wherein the plurality of nanomaterials are sulfonate-modified silica nanoparticles and at least one of the one or more polymer materials is an amorphous (PEG-ran-PPG based) imidazolium-functionalized polyurethane and at least one of the one or more polymer materials is a semi-cristalline (PEG based) imidazolium-functionalized polyurethane.

29. The ionic nanocomposite of claim 21, wherein the ionic nanocomposite exhibits shape memory behavior.

30. The ionic nanocomposite of claim 21, wherein the ionic nanocomposite exhibits a 5 times or greater increase in strain at break.

31. A film comprising one or more ionic nanocomposite of claim 21.

32. The film of claim 31, wherein the ionic nanocomposite is present as a film.

33. The film of claim 32, wherein the film is planar or non-planar.

34. An article of manufacture comprising one or more ionic nanocomposite of claim 21.

35. A device comprising a nanocomposite of claim 21.

36. The device of claim 35, wherein the device is a sensor or an actuator.

37. An ionic nanocomposite comprising:
a) a plurality of nanomaterials, wherein the nanomaterials are electrically charged; and
b) one or more polymer materials, each polymer material comprising a plurality of organic moieties and/or functional groups bearing the opposite charge of the nanomaterials, wherein the nanomaterials and the polymer material(s) interact through ionic interactions; and wherein the plurality of nanomaterials are sulfonate-modified silica nanoparticles and the one or more polymer materials are amorphous (PEG-ran-PPG based) imidazolium-functionalized polyurethane and a semi-cristalline (PEG based) imidazolium-functionalized polyurethane.

38. The ionic nanocomposite of claim 37, wherein the sulfonate-modified silica nanoparticles are present at 1 to 40 percent by weight of the nanocomposite.

39. The ionic nanocomposite of claim 37, wherein the ionic nanocomposite exhibits shape memory behavior.

40. The ionic nanocomposite of claim 37, wherein the ionic nanocomposite exhibits a 5 times or greater increase in strain at break.

41. A film comprising one or more ionic nanocomposite of claim 37.

42. The film of claim 41, wherein the ionic nanocomposite is present as a film.

43. The film of claim 42, wherein the film is planar or non-planar.

44. An article of manufacture comprising one or more ionic nanocomposite of claim 37.

45. A device comprising a nanocomposite of claim 37.

46. The device of claim 45, wherein the device is a sensor or an actuator.

* * * * *